United States Patent
Kwak et al.

(10) Patent No.: US 11,855,762 B2
(45) Date of Patent: Dec. 26, 2023

(54) METHOD AND DEVICE FOR RECEIVING FEEDBACK IN GROUP-BASED COMMUNICATION IN NR V2X

(71) Applicant: LG Electronics Inc., Seoul (KR)

(72) Inventors: Kyuhwan Kwak, Seoul (KR); Hanbyul Seo, Seoul (KR); Seungmin Lee, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 407 days.

(21) Appl. No.: 17/283,205

(22) PCT Filed: Sep. 3, 2019

(86) PCT No.: PCT/KR2019/011300
§ 371 (c)(1),
(2) Date: Apr. 6, 2021

(87) PCT Pub. No.: WO2020/091212
PCT Pub. Date: May 7, 2020

(65) Prior Publication Data
US 2021/0351878 A1 Nov. 11, 2021

Related U.S. Application Data

(60) Provisional application No. 62/754,551, filed on Nov. 1, 2018.

(51) Int. Cl.
*H04W 24/08* (2009.01)
*H04L 1/20* (2006.01)
(Continued)

(52) U.S. Cl.
CPC .............. *H04L 1/20* (2013.01); *H04W 24/08* (2013.01); *H04L 1/1864* (2013.01); *H04W 4/40* (2018.02)

(58) Field of Classification Search
CPC . H04L 1/20; H04L 1/1864; H04L 2001/0093; H04L 1/1692; H04L 1/1861;
(Continued)

(56) References Cited

U.S. PATENT DOCUMENTS 10,863,494 B2 * 12/2020 Zhang ..................... H04L 5/005
11,438,736 B2 * 9/2022 Fehrenbach ............ H04W 4/46
(Continued)

FOREIGN PATENT DOCUMENTS

| KR | 1020170115519 | 10/2017 |
| KR | 101900165 | 9/2018 |
| KR | 1020180109849 | 10/2018 |

*Primary Examiner* — Ahmed Elallam
(74) *Attorney, Agent, or Firm* — Fish & Richardson P.C.

(57) ABSTRACT

Provided are a method in which a terminal determines whether or not information is successfully transmitted to a plurality of terminals in a group in a wireless communication system, and a device supporting same. The method can comprise the steps of: transmitting the information to a plurality of terminals in the group; receiving zero or one or more feedback information items on a first resource in response to the transmitted information; and determining whether or not the information is successfully transmitted to the plurality of terminals in the group, on the basis of power measured in the first resource and power measured in a second resource.

15 Claims, 24 Drawing Sheets

(51) Int. Cl.
*H04W 4/40* (2018.01)
*H04L 1/1829* (2023.01)

(58) Field of Classification Search
CPC ....... H04W 24/08; H04W 4/40; H04W 92/18;
H04B 17/318; H04B 17/345
See application file for complete search history.

(56) References Cited

U.S. PATENT DOCUMENTS

| | | |
|---|---|---|
| 2017/0332213 A1 | 11/2017 | Xu et al. |
| 2018/0262398 A1 | 9/2018 | Chen et al. |
| 2021/0168648 A1* | 6/2021 | Lee .................. H04W 4/40 |
| 2021/0297199 A1* | 9/2021 | Miao ................ H04L 1/1896 |
| 2021/0323580 A1* | 10/2021 | Lee .................. B60W 60/001 |
| 2021/0368496 A1* | 11/2021 | Li .................... H04W 72/21 |
| 2021/0391954 A1* | 12/2021 | Kwak ............... H04L 5/0055 |
| 2021/0392547 A1* | 12/2021 | Tang ................. H04W 28/16 |
| 2022/0053496 A1* | 2/2022 | Yu ................... H04L 1/1896 |
| 2022/0295419 A1* | 9/2022 | Guo .................. H04L 1/1812 |

* cited by examiner

METHOD AND DEVICE FOR RECEIVING FEEDBACK IN GROUP-BASED COMMUNICATION IN NR V2X

CROSS-REFERENCE TO RELATED APPLICATIONS

This application is a National Stage application under 35 U.S.C. § 371 of International Application No. PCT/KR2019/011300, filed on Sep. 3, 2019, which claims the benefit of U.S. Provisional Application No. 62/754,551 filed on Nov. 1, 2018. The disclosures of the prior applications are incorporated by reference in their entirety.

BACKGROUND OF THE DISCLOSURE

Field of the Disclosure

The present disclosure relates to a wireless communication system.

Related Art

A wireless communication system is a multiple access system that supports communication of multiple users by sharing available system resources (e.g., a bandwidth, transmission power, and so on) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

Technical Objects

Meanwhile, in case that a common resource for HARQ feedback is configured, a receiving UE may inform a transmitting UE of NACK by transmitting a feedback signal on the common resource only when the reception of information fails. In addition, based on energy or power measured in the common resource by transmission of the feedback signal, the transmitting UE may determine whether or not the information transmitted by the transmitting UE has been successfully transmitted.

However, if external interference affects the common resource for HARQ feedback, the transmitting UE may not accurately determine whether or not the information transmitted by the transmitting UE has been successfully transmitted based on energy or power measured in the common resource. Therefore, in case that the UE performs group-based communication, there is a need to propose a method in which NACK-based HARQ transmission can be more effectively performed in the common resource for HARQ feedback.

Technical Solutions

In an embodiment, provided is a method for determining, by a user equipment (UE), whether or not information is successfully transmitted to a plurality of UEs in a group in a wireless communication system. The method may comprise: transmitting the information to the plurality of UEs in the group; receiving zero or at least one feedback information based on a first resource, in response to the transmitted information; and determining whether or not the information is successfully transmitted to the plurality of UEs in the group, based on power measured in the first resource and power measured in a second resource.

In another embodiment, provided is a user equipment (UE) configured to determine whether or not information is successfully transmitted to a plurality of UEs in a group in a wireless communication system. The UE may comprise: at least one memory; at least one transceiver; and at least one processor connected to the at least one memory and the at least one transceiver. The at least one processor may be configured to: control the at least one transceiver to transmit the information to the plurality of UEs in the group; control the at least one transceiver to receive zero or at least one feedback information based on a first resource, in response to the transmitted information; and determine whether or not the information is successfully transmitted to the plurality of UEs in the group, based on power measured in the first resource and power measured in a second resource.

Effects of the Disclosure

The performance of determining the HARQ feedback of the UE may be improved.

DESCRIPTION OF EXEMPLARY EMBODIMENTS

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the present disclosure will not be limited only to this.

Figure 1:
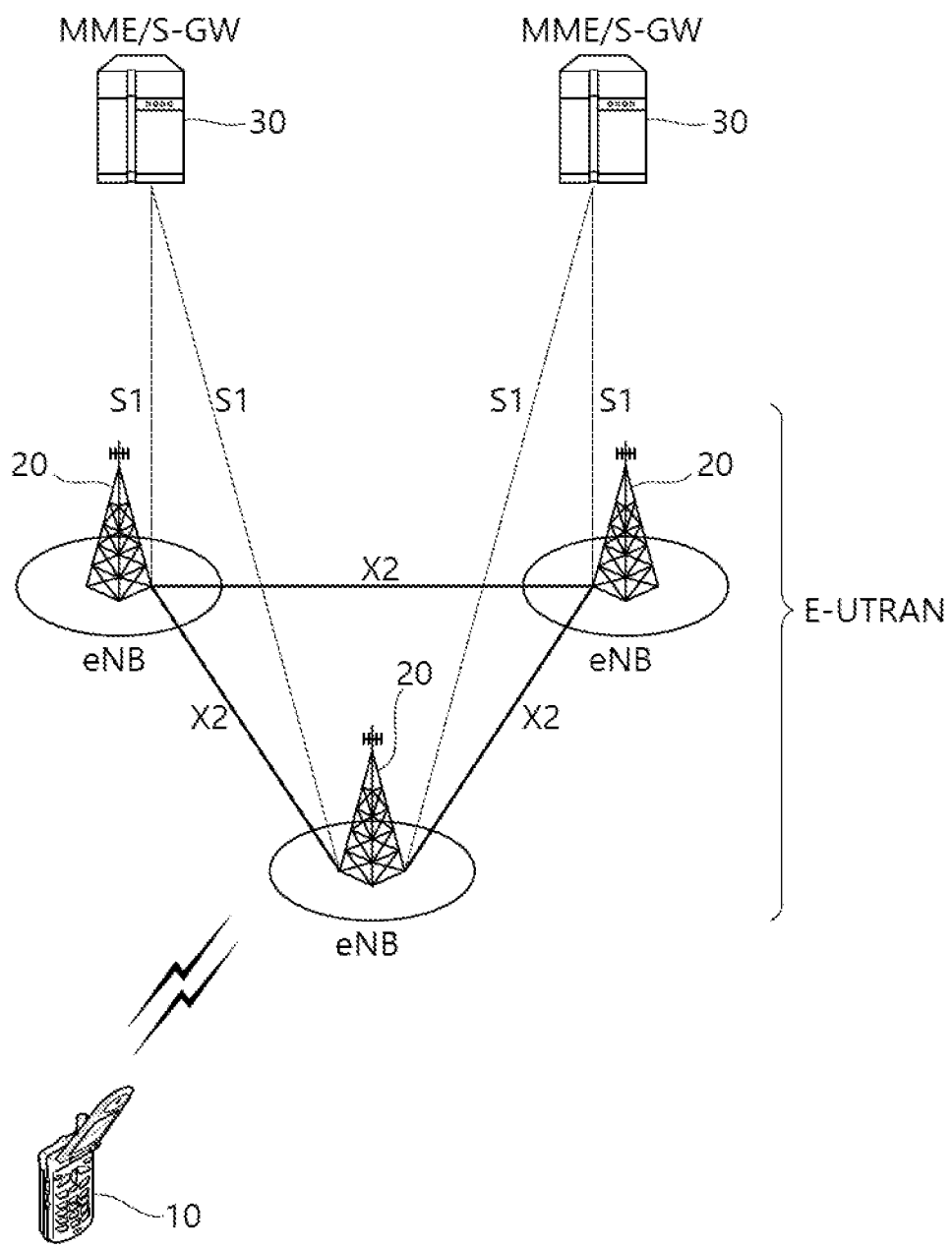
FIG. 1 shows a structure of an LTE system to which an exemplary embodiment of the present disclosure can be applied.

FIG. 1 shows a structure of an LTE system to which an exemplary embodiment of the present disclosure can be applied. This may also be referred to as an Evolved-UMTS Terrestrial Radio Access Network (E-UTRAN), or a Long Term Evolution (LTE)/LTE-A system.

Referring to FIG. 1, the E-UTRAN includes a base station (BS) (20), which provides a control plane and a user plane to a user equipment (UE) (10). The UE (10) may be fixed or mobile and may also be referred to by using different terms, such as Mobile Station (MS), User Terminal (UT), Subscriber Station (SS), Mobile Terminal (MT), wireless device, and so on. The base station (20) refers to a fixed station that communicated with the UE (10) and may also be referred to by using different terms, such as evolved-NodeB (eNB), Base Transceiver System (BTS), Access Point (AP), and so on.

The base stations (20) are interconnected to one another through an X2 interface. The base stations (20) are connected to an Evolved Packet Core (EPC) (30) through an S1 interface. More specifically, the base station (20) are connected to a Mobility Management Entity (MME) through an S1-MME interface and connected to Serving Gateway (S-GW) through an S1-U interface.

The EPC (30) is configured of an MME, an S-GW, and a Packet Data Network-Gateway (P-GW). The MME has UE access information or UE capability information, and such information may be primarily used in UE mobility management. The S-GW is a gateway having an E-UTRAN as its endpoint. And, the P-GW is a gateway having a PDN as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 2:
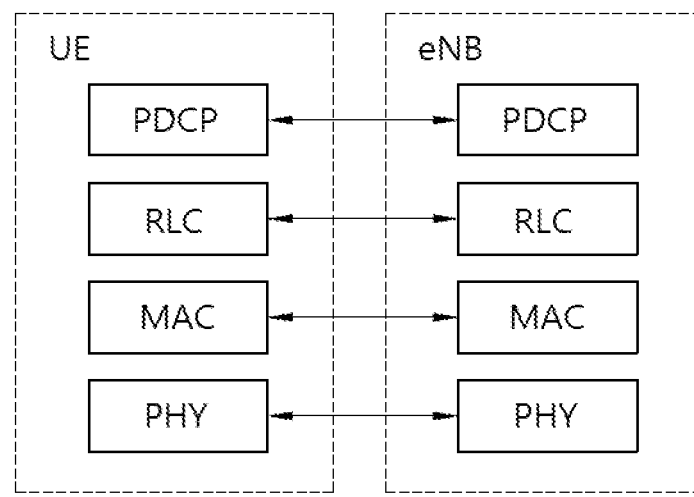
FIG. 2 shows a radio protocol architecture of a user plane to which an exemplary embodiment of the present disclosure can be applied.
Figure 3:
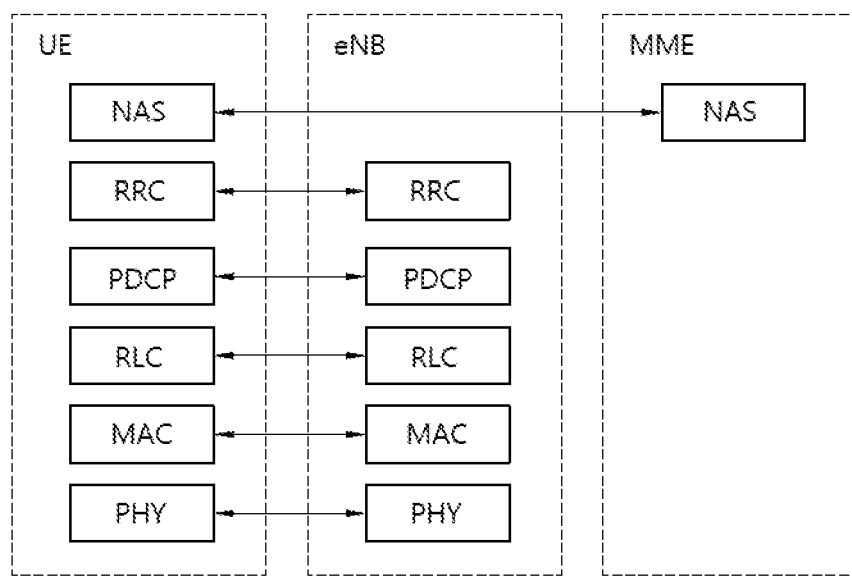
FIG. 3 shows a radio protocol architecture of a control plane to which an exemplary embodiment of the present disclosure can be applied.

FIG. 2 shows a radio protocol architecture of a user plane to which an exemplary embodiment of the present disclosure can be applied. FIG. 3 shows a radio protocol architecture of a control plane to which an exemplary embodiment of the present disclosure can be applied. The user plane is a protocol stack for user data transmission, and the control plane is a protocol stack for control signal transmission.

Referring to FIG. 2 and FIG. 3, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of RLC SDU.

In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, PDCP layer) in order to transport data between the UE and the network.

Functions of a Packet Data Convergence Protocol (PDCP) in the user plane include transfer, header compression, and ciphering of user data. Functions of a Packet Data Convergence Protocol (PDCP) in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 4:
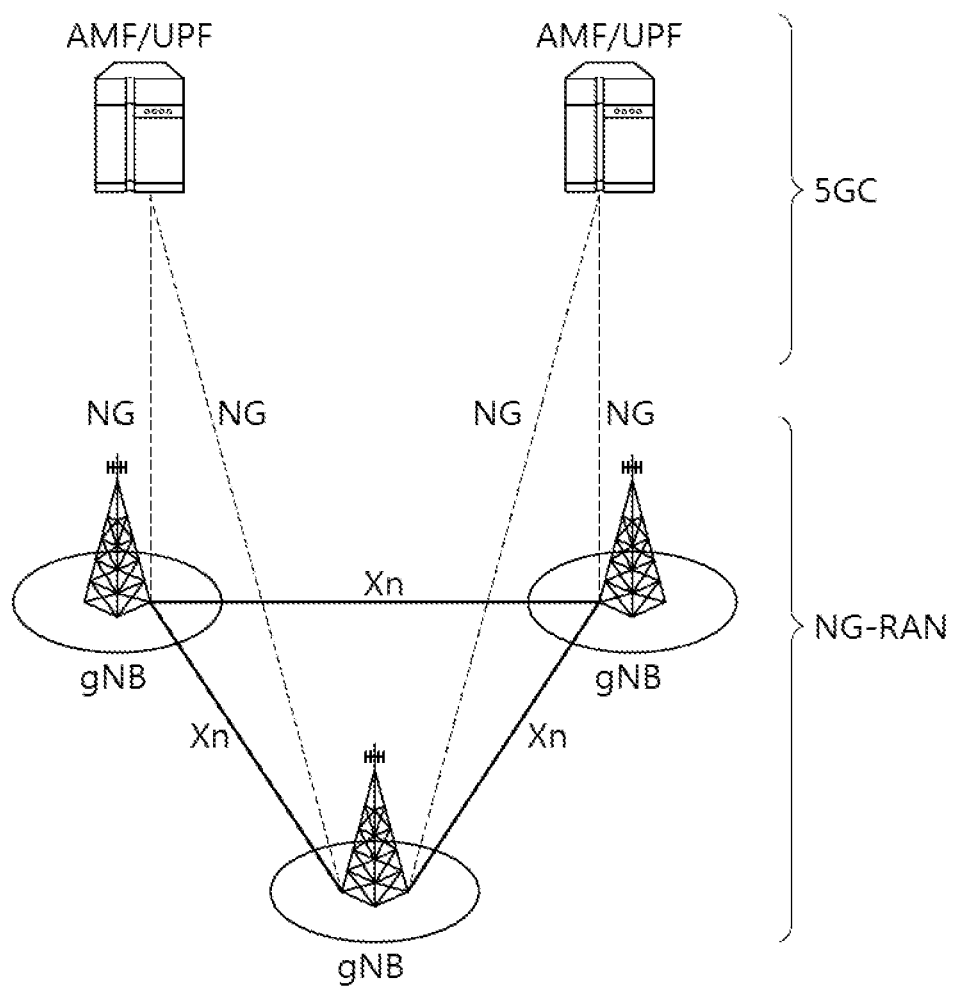
FIG. 4 shows a structure of an NR system to which an exemplary embodiment of the present disclosure can be applied.

FIG. 4 shows a structure of an NR system to which an exemplary embodiment of the present disclosure can be applied.

Referring to FIG. 4, an NG-RAN may include a gNB and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 5:
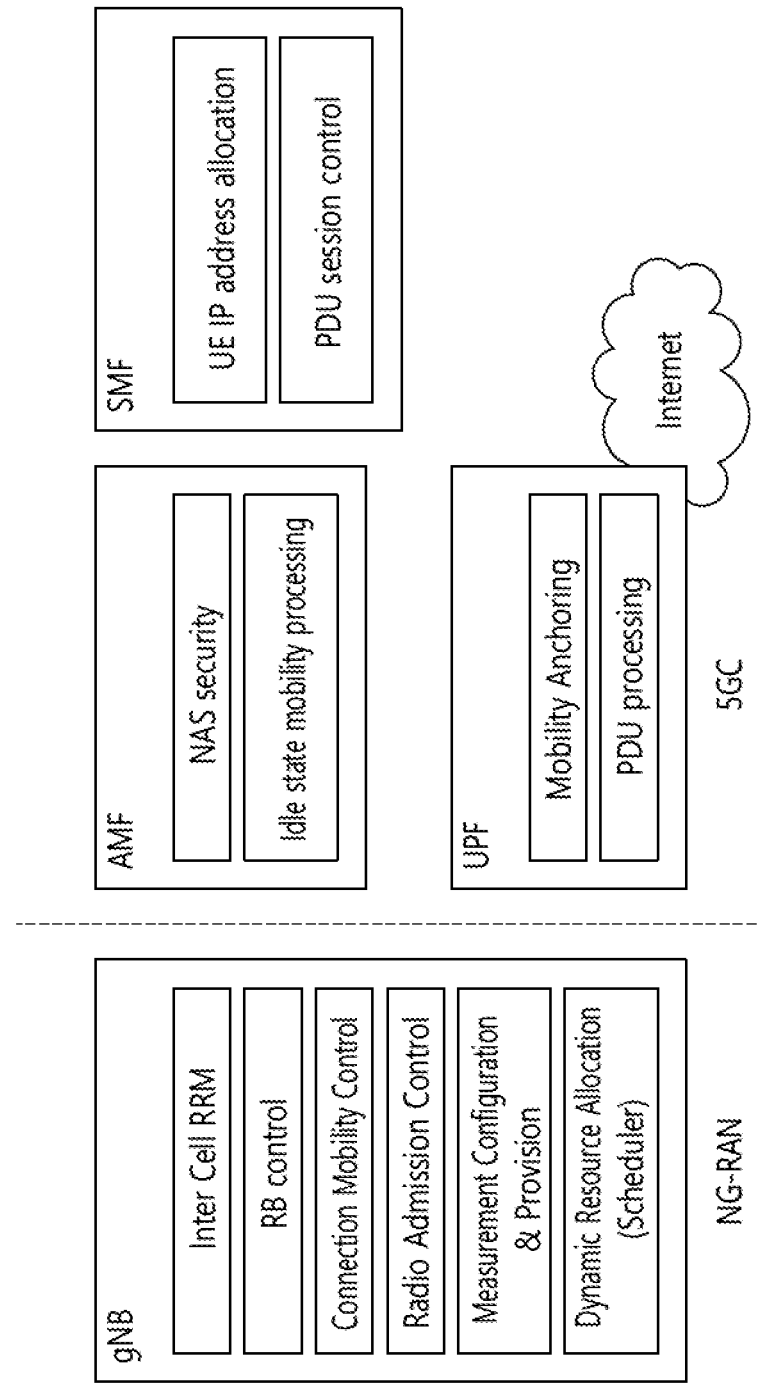
FIG. 5 shows a functional division between an NG-RAN and a 5GC to which an exemplary embodiment of the present disclosure can be applied.

FIG. 5 shows a functional division between an NG-RAN and a 5GC to which an exemplary embodiment of the present disclosure can be applied.

Referring to FIG. 5, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as NAS security, Idle state mobility processing, and so on. A UPF may provide functions, such as Mobility Anchoring, PDU processing, and so on. A Session Management Function (SMF) may provide functions, such as user equipment (UE) IP address allocation, PDU session control, and so on.

Meanwhile, a new RAT system such as NR may use an OFDM transmission scheme or a transmission scheme similar thereto. The new RAT system may follow OFDM parameters different from OFDM parameters of the LTE. Alternatively, the new RAT system may follow the existing LTE/LTE-A numerology, but may have a larger system bandwidth (e.g., 100 MHz). Alternatively, one cell may support a plurality of numerologies. That is, UEs operating based on different numerologies may coexist in one cell.

Figure 6:
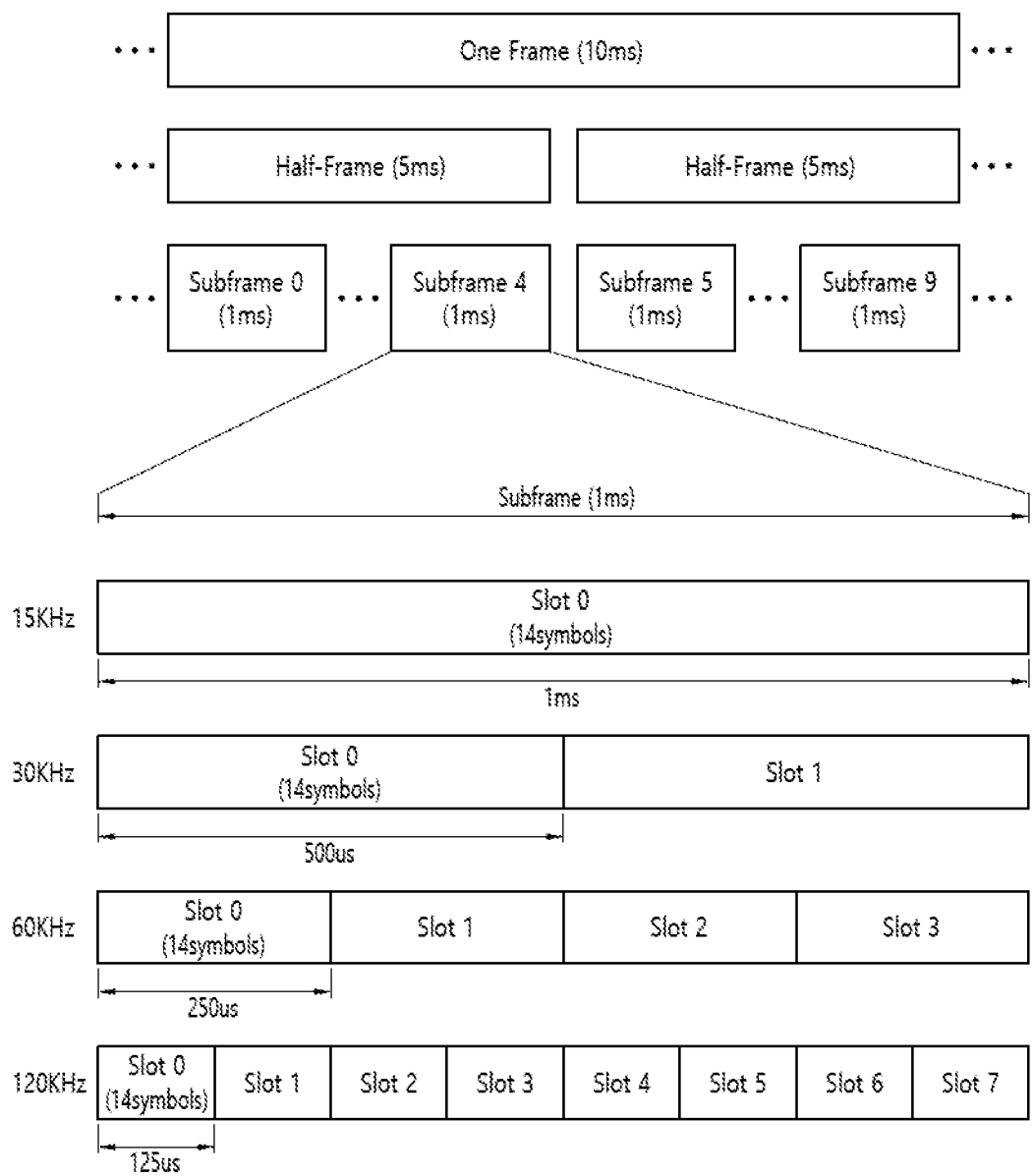
FIG. 6 shows a structure of a radio frame of an NR to which an exemplary embodiment of the present disclosure can be applied.

FIG. 6 shows a structure of a radio frame of an NR to which an exemplary embodiment of the present disclosure can be applied.

Referring to FIG. 6, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and an SC-FDMA symbol (or DFT-s-OFDM symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration ($\mu$), in a case where a normal CP is used.

TABLE 1

| SCS (15*2$^u$) | $N^{slot}_{symb}$ | $N^{frame,\,u}_{slot}$ | $N^{subframe,\,u}_{slot}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15*2$^u$) | $N^{slot}_{symb}$ | $N^{frame,\,u}_{slot}$ | $N^{subframe,\,u}_{slot}$ |
|---|---|---|---|
| 60 kHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

Figure 7:
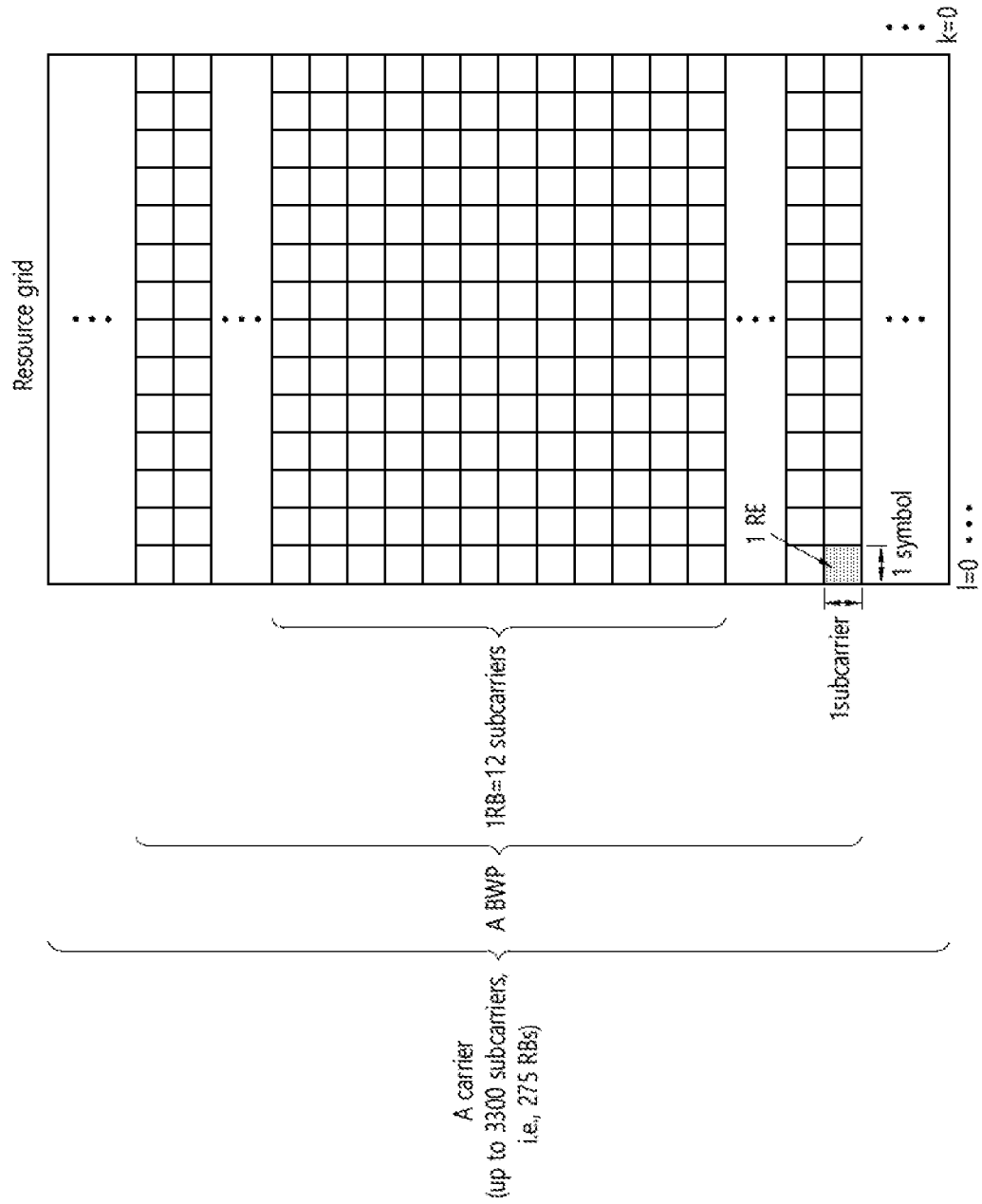
FIG. 7 shows a structure of a slot of an NR frame to which an exemplary embodiment of the present disclosure can be applied.

FIG. 7 shows a structure of a slot of an NR frame to which an exemplary embodiment of the present disclosure can be applied.

Referring to FIG. 7, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (P)RBs in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, V2X or sidelink communication will be described in detail.

Figure 8:
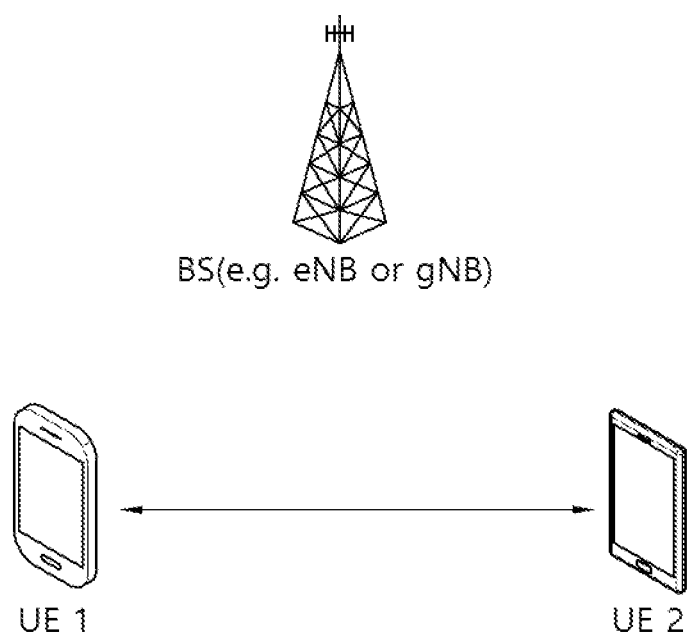
FIG. 8 shows UEs performing V2X or sidelink communication to which an exemplary embodiment of the present disclosure can be applied.

FIG. 8 shows UEs performing V2X or sidelink communication to which an exemplary embodiment of the present disclosure can be applied.

Referring to FIG. 8, in V2X/sidelink communication, the term terminal may mainly refer to a terminal (or equipment) used by a user. However, in case a network equipment, such as a base station, transmits and receives signals in accordance with a communication scheme between the network equipment and a user equipment (UE) (or terminal), the base station may also be viewed as a type of user equipment (or terminal).

User equipment 1 (UE1) may select a resource unit corresponding to a specific resource within a resource pool, which refers to a set of resources, and UE1 may then be operated so as to transmit a sidelink signal by using the corresponding resource unit. User equipment 2 (UE2), which corresponds to a receiving UE, may be configured with a resource pool to which UE1 can transmit signals, and may then detect signals of UE1 from the corresponding resource pool.

Herein, in case UE1 is within a connection range of the base station, the base station may notify the resource pool. Conversely, in case UE1 is outside connection range of the base station, another UE may notify the resource pool or a pre-determined resource may be used.

Generally, a resource pool may be configured in a plurality of resource units, and each UE may select one resource unit or a plurality of resource units and may use the selected resource unit(s) for its sidelink signal transmission.

Figure 9:
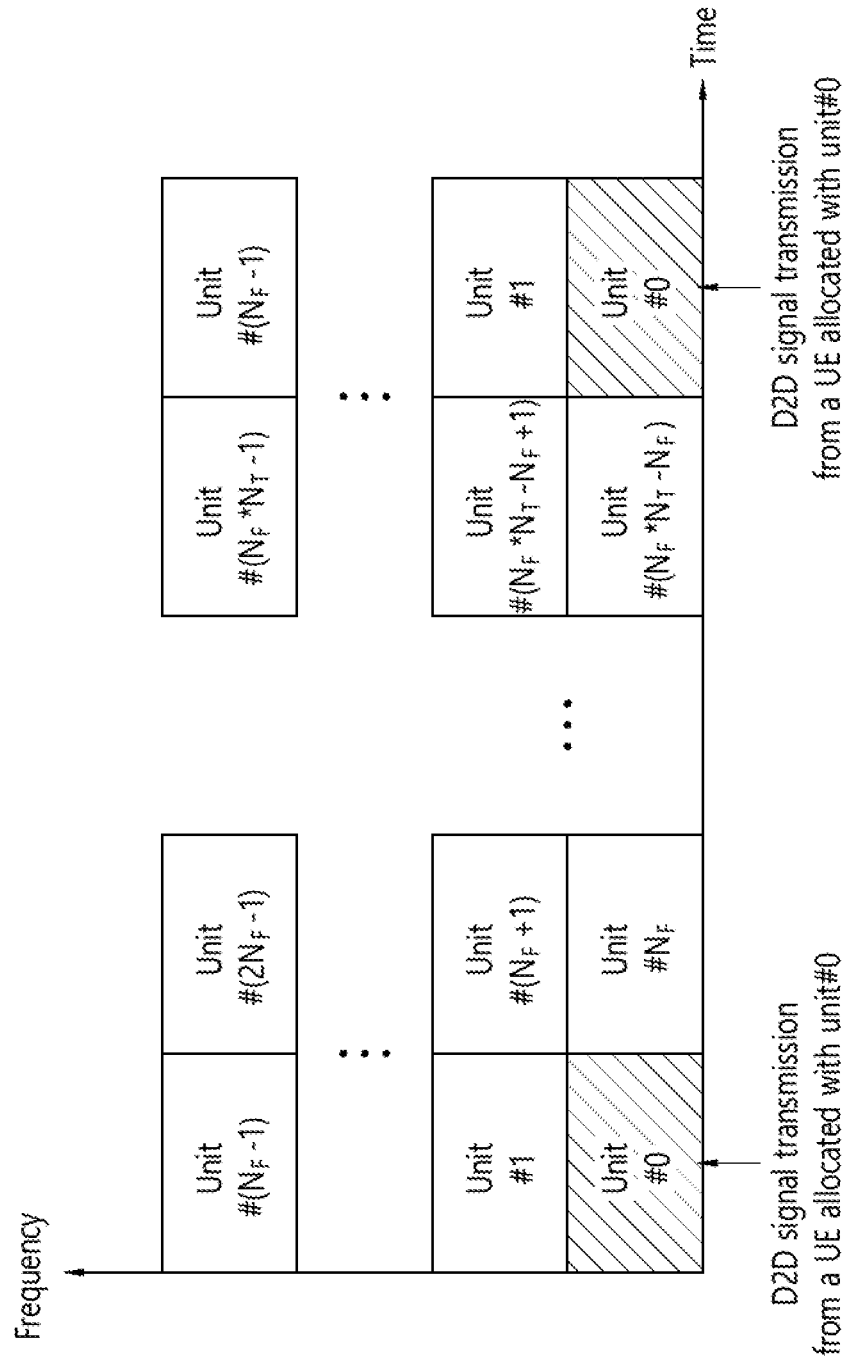
FIG. 9 shows an exemplary configuration of a resource unit to which an exemplary embodiment of the present disclosure can be applied.

FIG. 9 shows an exemplary configuration of a resource unit to which an exemplary embodiment of the present disclosure can be applied.

Referring to FIG. 9, the total frequency resources of the resource pool may be divided into NF number of resource units, the total time resources of the resource pool may be divided into NT number of resource units. Therefore, a total of NF*NT number of resource units may be defined in the resource pool. FIG. 9 shows an example of a case where the corresponding resource pool is repeated at a cycle of NT number of subframes.

As shown in FIG. 9, one resource unit (e.g., Unit #0) may be periodically and repeatedly indicated. Alternatively, in order to achieve a diversity effect in the time or frequency level (or dimension), an index of a physical resource unit to which a logical resource unit is mapped may be changed to a pre-determined pattern in accordance with time. In such resource unit structure, the resource pool may refer to a set of resource units that can be used for a transmission that is performed by a user equipment (UE), which intends to transmit sidelink signals.

The resource pool may be segmented to multiple types. For example, depending upon the content of a sidelink signal being transmitted from each resource pool, the resource pool may be divided as described below.

(1) Scheduling Assignment (SA) may be a signal including information, such as a position of a resource that is used for the transmission of a sidelink data channel, a Modulation and Coding Scheme (MCS) or MIMO transmission scheme needed for the modulation of other data channels, a Timing Advance (TA), and so on. The SA may also be multiplexed with sidelink data within the same resource unit and may then be transmitted, and, in this case, an SA resource pool may refer to a resource pool in which the SA is multiplexed with the sidelink data and then transmitted. The SA may also be referred to as a sidelink control channel.

(2) A Physical Sidelink Shared Channel (PSSCH) may be a resource pool that is used by a transmitting UE for transmitting user data. If the SA is multiplexed with sidelink data within the same resource unit and then transmitted, only a sidelink data channel excluding the SA information may be transmitted from the resource pool that is configured for the sidelink data channel. In other words, REs that were used for transmitting SA information within a separate resource unit of the SA resource pool may still be used for transmitting sidelink data from the resource pool of a sidelink data channel.

(3) A discovery channel may be a resource pool that is used by the transmitting UE for transmitting information, such as its own ID. By doing so, the transmitting UE may allow a neighboring UE to discover the transmitting UE.

Even if the content of the above-described sidelink signal is the same, different resource pools may be used depending upon the transmission/reception attribute of the sidelink signal. For example, even if the same sidelink data channel or discovery message is used, the resource pool may be identified as a different resource pool depending upon a transmission timing decision method (e.g., whether the transmission is performed at a reception point of the synchronization reference signal or whether transmission is performed at the reception point by applying a consistent timing advance), a resource allocation method (e.g., whether the base station designates a transmission resource of a separate signal to a separate transmitting UE or whether a separate transmitting UE selects a separate signal transmission resource on its own from the resource pool), and a signal format (e.g., a number of symbols occupied by each sidelink signal within a subframe or a number of subframes being used for the transmission of one sidelink signal) of the sidelink signal, signal intensity from the base station, a transmitting power intensity (or level) of a sidelink UE, and so on.

Figure 10:
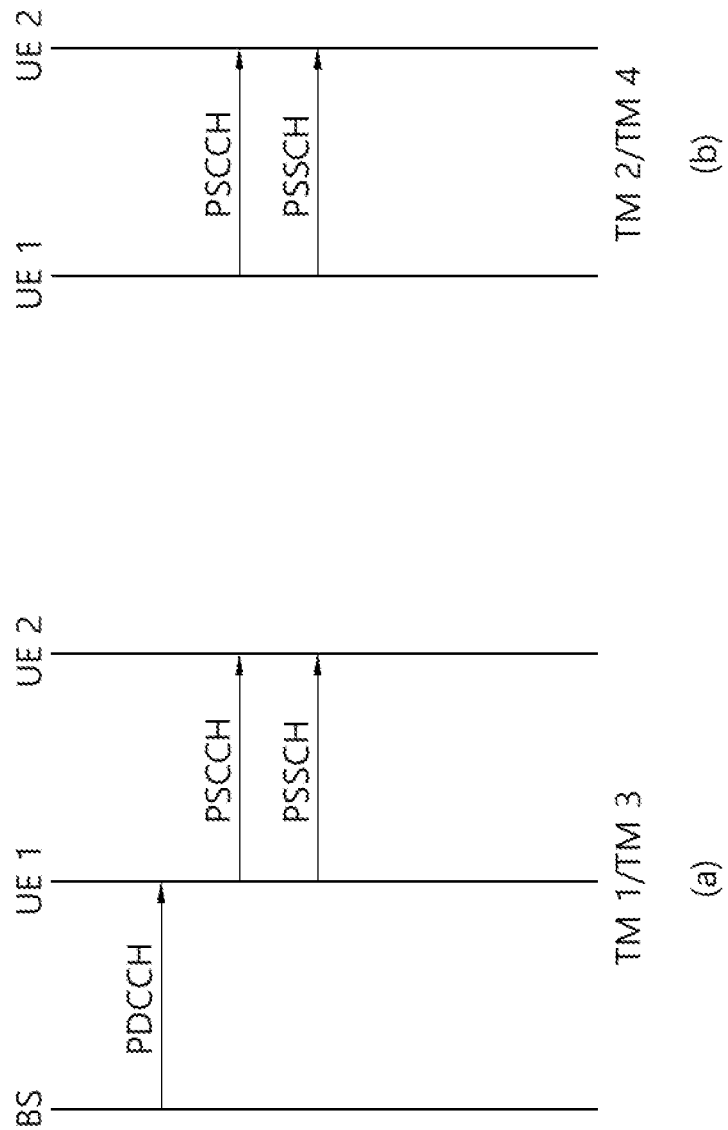
FIG. 10 shows UE operations according to a transmission mode (TM) being related to sidelink/V2X communication to which an exemplary embodiment of the present disclosure can be applied.

FIG. 10 shows UE operations according to a transmission mode (TM) being related to sidelink/V2X communication to which an exemplary embodiment of the present disclosure can be applied.

(a) of FIG. 10 represents UE operations being related to transmission mode 1 or transmission mode 3, and (b) of FIG. 10 represents UE operations being related to transmission mode 2 or transmission mode 4.

Referring to (a) of FIG. 10, in transmission modes 1/3, the base station performs resource scheduling to UE1 via PDCCH (more specifically, DCI), and UE1 performs sidelink/V2X communication with UE2 according to the corresponding resource scheduling. After transmitting sidelink control information (SCI) to UE2 via physical sidelink control channel (PSCCH), UE1 may transmit data based on the SCI via physical sidelink shared channel (PSSCH). Transmission mode 1 may be applied to a sidelink communication, and transmission mode 3 may be applied to a V2X communication.

Referring to (b) of FIG. 10, in transmission modes 2/4, the UE may schedule resources on its own. More specifically, transmission mode 2 may be applied to a sidelink communication, and the UE may select a resource from a predetermined resource pool on its own and may then perform sidelink operations. Transmission mode 4 may be applied to a V2X communication, and the UE may carry out a sensing/SA decoding procedure, and so on, and select a resource within a selection window on its own and may then perform V2X operations. After transmitting the SCI to UE2 via PSCCH, UE1 may transmit SCI-based data via PSSCH. Hereinafter, the transmission mode may be abbreviated to mode.

Meanwhile, in order to increase reliability for transmission of information in communication between UEs, a method of transmitting HARQ feedback by a UE receiving the information may be considered. However, in group-based communication (e.g., groupcast communication), if each of a plurality of receiving UEs transmits HARQ feedback, there may be a problem in that resources for each HARQ feedback should be configured separately, and so on. For example, in group-based communication, if one UE transmits information to a plurality of UE, and if each of the plurality of UEs receiving the information transmits HARQ feedback indicating whether or not to receive the information, there may be a problem in that resources for each HARQ feedback should be configured separately, and so on. Therefore, in order to prevent the above situation, a method of configuring a common resource for HARQ feedback for information transmitted by a transmitting UE may be considered. In case that the common resource for HARQ feedback is configured, the receiving UE may inform the transmitting UE of NACK by transmitting a feedback signal on the common resource only when the reception of information fails. The feedback signal may be a specific sequence. In the present disclosure, a method of transmitting the feedback signal only when the receiving UE fails to receive information transmitted by the transmitting UE may be referred to as NACK-based HARQ feedback transmission.

In the above case, based on energy or power measured in the common resource by the transmission of the feedback signal, the transmitting UE may determine whether or not the information transmitted by the transmitting UE has been successfully transmitted. For example, if energy or power measured in the common resource is greater than or equal to a certain threshold, the transmitting UE may determine that at least one receiving UE has transmitted the feedback signal on the common resource, and the transmitting UE may perform retransmission. On the other hand, for example, if energy or power measured in the common resource is less than the certain threshold, the transmitting UE may determine that all receiving UEs have not transmitted the feedback signal, and the transmitting UE may determine that retransmission is unnecessary.

However, in case that external interference affects the common resource configured for HARQ feedback, the transmitting UE may not accurately determine whether the information transmitted by the transmitting UE has been successfully transmitted based on energy or power measured in the common resource. For example, in case that interference caused by transmission of UE(s) outside a group affects the common resource configured for HARQ feedback, energy or power measured in the common resource, even though all receiving UEs have not transmitted HARQ feedback, energy or power measured in the common resource may exceed a certain threshold due to the interference. In this case, even though all receiving UEs have successfully received the information, the transmitting UE may determine that transmission of the information has failed, and the transmitting UE may unnecessarily retransmit the information. Therefore, in case that the UE performs group-based communication, there is a need to propose a method capable of more effectively performing NACK-based HARQ transmission in the common resource for HARQ feedback. Hereinafter, according to an embodiment of the present disclosure, a method for determining, by the transmitting UE, whether or not information has been successfully transmitted to a plurality of UEs in a group and an apparatus supporting the same will be described.

In the present disclosure, a proposed method and/or an embodiment may be regarded as a single proposed method, but a combination between each proposed method and/or the embodiment may also be regarded as a new method. Also, it goes without saying that the proposed method is not limited to a specific embodiment and is not limited to a specific system disclosed in the present disclosure. All parameters, operations, a combination between each parameter and/or each operation, whether the corresponding parameters and/or the operations are applied, and/or whether a combination between each parameter and/or each operation is applied may be (pre-)configured through higher layer signaling and/or physical layer signaling from the base station to the UE, or may be pre-defined in a system. For example, the higher layer signaling may be application layer signaling, L3 signaling, L2 signaling, and so on. For example, physical layer signaling may be L1 signaling. Also, each of the proposed methods of the present disclosure may be defined as one operation mode, and the base station may (pre-)configure one of them to the UE through higher layer signaling and/or physical layer signaling. The base station may allow the UE to operate according to the corresponding mode. In the present disclosure, the transmission time interval (TTI) may be a unit of various lengths such as a sub-slot/a slot/a subframe, or a basic unit that is a basic transmission unit, and so on. In the present disclosure, the UE may be various types of devices such as a vehicle, a pedestrian UE, and so on. Also, in the present disclosure, matters related to operation of a UE, a base station, and/or a road side unit (RSU) may not be limited to each device type, and may be applied to different types of devices. For example, in the present disclosure, a matter described as an operation of a base station may be applied to an operation of a UE.

According to an embodiment of the present disclosure, when the transmitting UE determines whether or not the receiving UEs have successfully received the information transmitted by the transmitting UE, the transmitting UE may not determine whether or not the transmission of the information is successful based on only energy or power measured in the common resource configured for NACK-based HARQ feedback and a threshold. Specifically, according to an embodiment of the present disclosure, the transmitting UE may determine whether or not the receiving UEs have successfully received the information transmitted by the transmitting UE, based on energy or power measured by the transmitting UE in the common resource configured for HARQ feedback, a threshold, and information on interference affecting the common resource configured for HARQ feedback. Hereinafter, in the present disclosure, the common resource configured for NACK-based HARQ feedback may be referred to as various terms such as a common resource configured for HARQ feedback, a common resource for HARQ feedback, a common HARQ feedback resource, a common feedback resource, a common resource, a resource of common, or a non-zero power HARQ feedback resource.

In order to measure information on interference, specific resource(s) may be configured. The specific resource(s) may be resource(s) for which UEs belonging to a group in which group-based transmission is performed do not perform transmission. The specific resource(s) may be configured resource(s) for which the transmitting UE measures interference from outside the group. Alternatively, the specific resource(s) may be resource(s) configured for deriving/determining/adjusting a threshold used by the transmitting UE to determine whether or not the receiving UEs have successfully received the information transmitted by the transmitting UE. For example, the specific resource(s) may be configured by a UE, and may be shared with UEs in the group. For example, the specific resource(s) may be (pre-)configured by a base station, and may be shared with UEs in the group. For example, the specific resource(s) may be pre-defined in the system. Hereinafter, in the present disclosure, a resource for which UEs belonging to the group do not perform transmission may be referred to as various terms such as a null resource, an interference measurement resource, an interference resource, or a zero power HARQ feedback resource. For example, the null resource may be configured in a unit of a RE. For example, the null resource may be configured in a unit of an RE group including a plurality of REs (e.g., in a unit of a sub-channel). For example, the null resource may be configured in a unit of one or more REs and/or an RE group. In this case, one or more REs and/or an RE group may be configured adjacent to each other. Alternatively, one or more REs and/or an RE group may be configured apart from each other.

According to an embodiment of the present disclosure, the null resource may be configured for some REs in a defined common HARQ feedback resource. Alternatively, the null resource may be configured for some REs other than the defined common HARQ feedback resource.

According to an embodiment of the present disclosure, based on the null resource configured in the group as described above, the transmitting UE may measure interference outside the group. Since the transmitting UE may consider that the UEs in the group will not perform transmission on the null resource, the transmitting UE may measure the interference from outside the group on the null resource. In addition, the transmitting UE may compare energy or power measured in the common resource configured for NACK-based HARQ feedback transmission and energy or power measured in the null resource (i.e., interference energy or power according to transmission outside the group). In addition, if the difference between the energy or power measured in the common resource and the energy or power measured in the null resource is greater than or equal to (or greater than) a certain threshold, the transmitting UE may finally determine that the transmission of information has failed. On the other hand, if the difference between the energy or power measured in the common resource and the energy or power measured in the null resource is less than (or less than or equal to) the certain threshold, the transmitting UE may finally determine that the information has been successfully transmitted. For example, the threshold may be (pre-)configured by the base station (or other UEs) to the UE through higher layer signaling and/or physical layer signaling, or may be pre-defined in the system.

Alternatively, according to an embodiment of the present disclosure, based on the null resource configured in the group as described above, the transmitting UE may measure interference from outside the group on the null resource. In addition, the transmitting UE may adjust a threshold based on energy or power measured in the null resource (i.e., energy or power of interference and noise due to transmission outside the group). For example, the transmitting UE may take a correlation for a specific sequence (e.g., a sequence used for NACK-based HARQ feedback transmission) for a certain time period on the null resource, and may accumulate these values, and then may configure a value corresponding to an upper specific ratio (e.g., 1%) as a threshold. In this case, in the case of the certain time period, it may be configured in the form of a moving window, and the UE may perform the operation in a period within the corresponding window. In addition, the size of the window may be pre-defined in the system, or may be (pre-)configured by the base station to the UE through higher layer signaling and/or physical layer signaling. The threshold may be a value for the transmitting UE to determine whether or not the receiving UEs have successfully received the information transmitted by the transmitting UE. For example, the transmitting UE may adjust the threshold to a larger value as energy or power measured in the null resource increases. For example, the transmitting UE may adjust the threshold to a smaller value as energy or power measured in the null resource decreases. That is, according to an embodiment of the present disclosure, the threshold may be adaptively adjusted based on energy or power measured in the null resource. Thereafter, for example, if energy or power measured in the common resource configured for NACK-based HARQ feedback transmission is greater than or equal to (or greater than) the adjusted threshold, the transmitting UE may finally determine that transmission of information has failed. On the other hand, if energy or power measured in the common resource configured for NACK-based HARQ feedback transmission is less than (or less than or equal to) the adjusted threshold, the transmitting UE may finally determine that the information has been successfully transmitted.

Meanwhile, in the case of the null resource configured for each group according to an embodiment of the present disclosure, the null resource needs to be configured so as not to overlap as much as possible between different groups. This is to more accurately reflect external interference within each group. Hereinafter, according to an embodiment of the present disclosure, a method of configuring the null resource will be described in detail.

Figure 11:
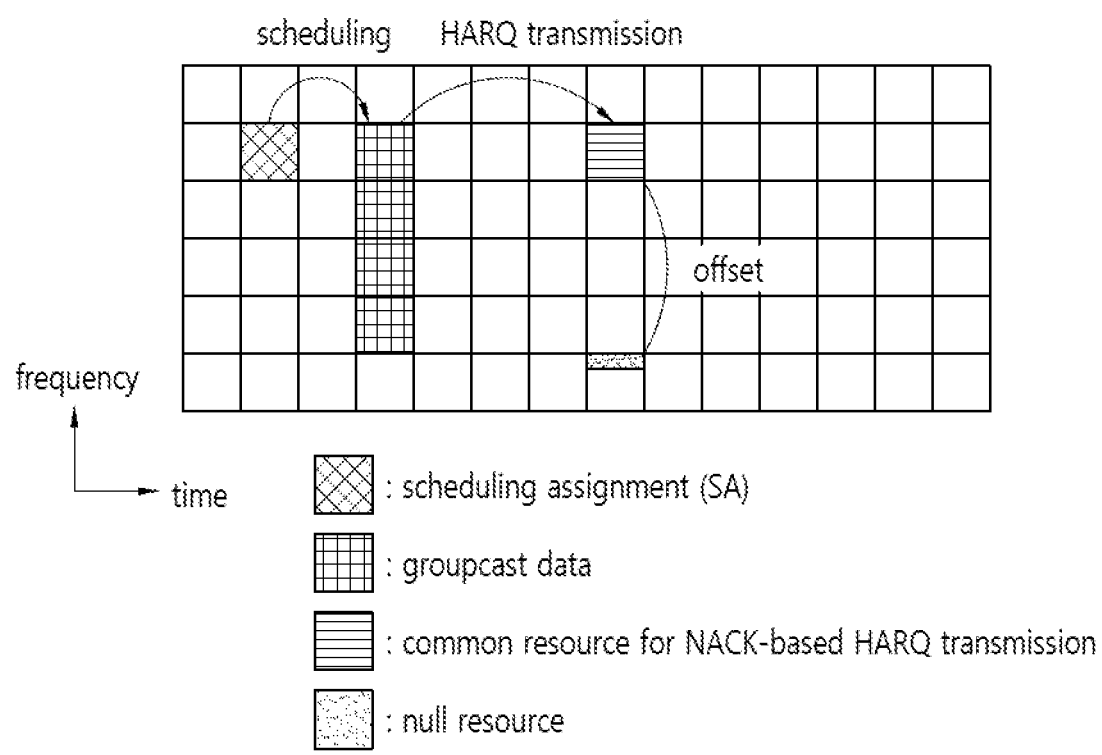
FIG. 11 shows an example in which a null resource is configured by applying an offset from a common resource for HARQ feedback transmission according to an embodiment of the present disclosure.

FIG. 11 shows an example in which a null resource is configured by applying an offset from a common resource for HARQ feedback transmission according to an embodiment of the present disclosure.

Referring to FIG. 11, in consideration of a half-duplex problem of the transmitting UE performing group-based transmission, within a time duration of the common resource configured for the HARQ feedback transmission, one or more REs and/or a RE group may be configured as the null resource. For example, in case that the transmitting UE performs group-based transmission within a specific group, if the common resource for the group-based transmission is configured, one or more REs and/or the RE group located apart from the common resource by a specific offset in the frequency axis and/or the time axis may be configured as the null resource. For example, in case that the transmitting UE performs group-based transmission within a specific group, if the common resource for the group-based transmission is configured, one or more REs and/or the RE group located apart from some REs among resources included in the common resource by a specific offset in the frequency axis and/or the time axis may be configured as the null resource. Additionally, resource(s) having relatively low interference through sensing of the UE may be configured as the common resource. Additionally, the frequency axis specific offset may be determined in consideration of an in-band emission effect in which the null resource may be affected from the common resource. For example, the specific offset may be (pre-)configured by the base station (or other UEs) to the UE through higher layer signaling and/or physical layer signaling, or may be pre-defined in the system.

Figure 12:
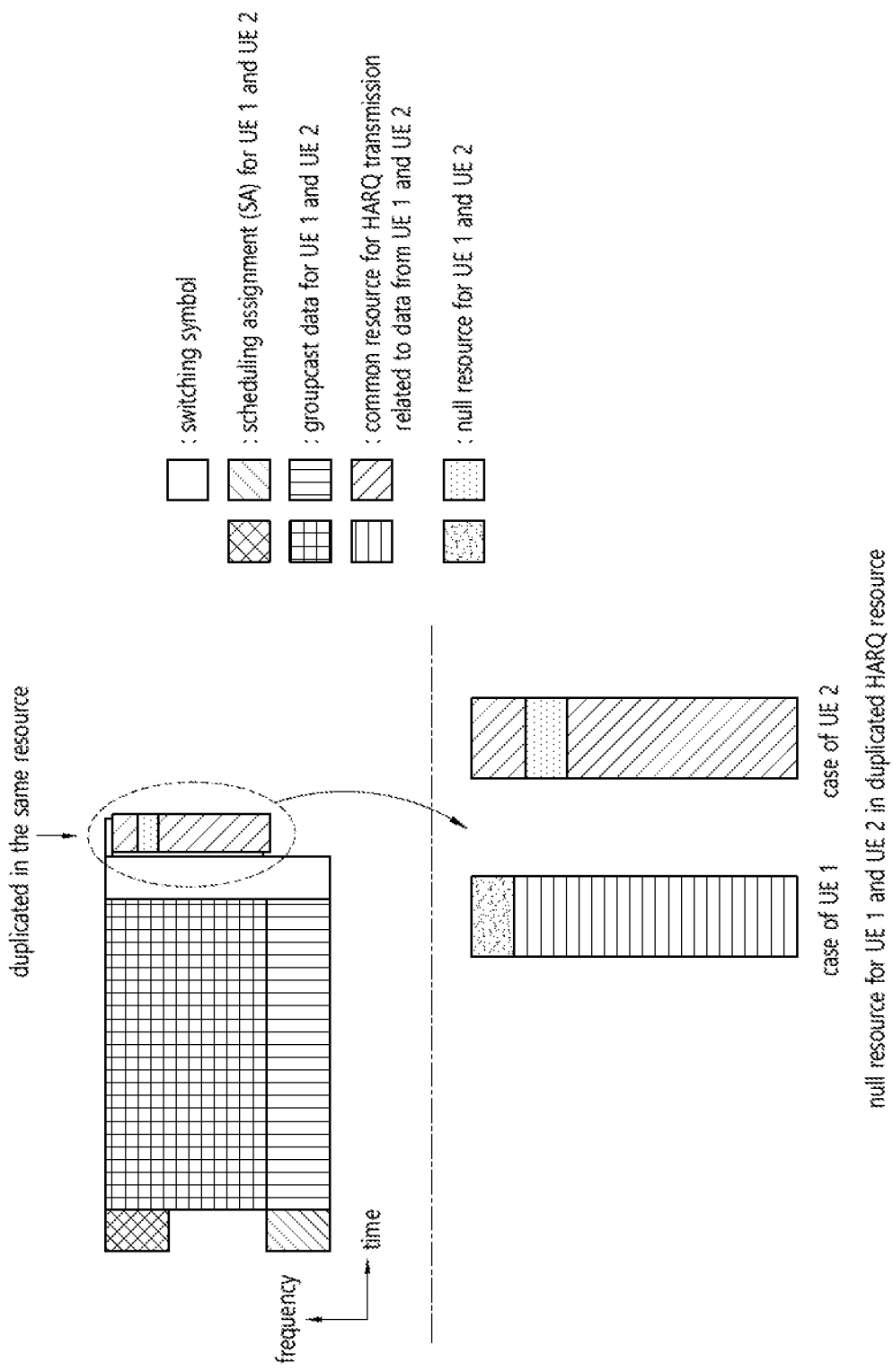
FIG. 12 shows an example in which a location of a null resource is differently configured according to a group in a common resource for HARQ feedback transmission according to an embodiment of the present disclosure.

FIG. 12 shows an example in which a location of a null resource is differently configured according to a group in a common resource for HARQ feedback transmission according to an embodiment of the present disclosure.

According to an embodiment of the present disclosure, if the common resource for HARQ feedback transmission is determined, the location of the null resource may be determined according to a (pre-defined) rule within the common resource. In addition, remaining resource(s) may be determined as resource(s) for actually transmitting a HARQ feedback signal. Preferably, in an RB or a sub-channel that is the basic unit of sidelink transmission resource allocation, the location of null resources may be pseudo-randomly determined. In this case, in order to configure the location of the null resources as different as possible for different groups, the location of the null resources may be derived/obtained from a group ID. Alternatively, in order to configure the location of the null resources as different as possible for different groups, the location of the null resources may be derived/obtained from a location of a group header, a location of the transmitting UE, and so on.

In addition, if the number of candidate locations of the null resources is smaller than the group ID, the locations of the null resources used in different groups may continuously overlap. In order to prevent the above situation, it may be determined that the locations of the null resources are changed according to a (pre-defined) rule according to an index (e.g., a slot index, etc.) that changes over time. Specifically, for example, a plurality of candidate locations of the null resources may be pre-configured, and an index may be assigned to each of the plurality of candidate locations. In this case, the UE may use candidate locations of the null resources having an index corresponding to a sequence generated over time in a pseudo-random sequence generator initialized using the group ID at a corresponding time.

Referring to FIG. 12, it is assumed that UE 1 and UE 2 belong to different groups and transmit data within each group. According to an embodiment of the present disclosure, even if locations of the common resources for HARQ transmission of the two groups overlap in the same resource, UE 1 and UE 2 may differently determine/configure locations of the null resources according to the operation. Accordingly, it is possible to prevent a case where the transmitting UE misunderstands the interference environment.

Alternatively, according to an embodiment of the present disclosure, a resource pool in which the null resources can be configured may be configured, and based on the group ID, one or more REs and/or an RE group may be arbitrarily configured as the null resource in the resource pool. For example, the resource pool may mean all or some resources existing in the same time interval as the common resource for HARQ feedback transmission. Additionally, based on the group ID, the location of the transmitting UE performing group-based transmission, and/or an ID of the transmitting UE performing group-based transmission (i.e., source ID), one or more REs and/or an RE group may be configured as the null resource in the resource pool. Additionally, in case that a header UE performing a coordinator role exists in the group, based on the group ID, the location of the header UE, and/or an ID of the header UE (i.e., source ID), one or more REs and/or an RE group may be configured as the null resource in the resource pool.

Alternatively, according to an embodiment of the present disclosure, even if a resource pool in which the null resources can be configured may be not configured, one or more REs and/or an RE group may be arbitrarily configured as the null resource in the entire resource pool based on the group ID. Additionally, based on the group ID, the location of the transmitting UE performing group-based transmission, and/or an ID of the transmitting UE performing group-based transmission (i.e., source ID), one or more REs and/or an RE group may be configured as the null resource in the entire resource pool. Additionally, in case that a header UE performing a coordinator role exists in the group, based on the group ID, the location of the header UE, and/or an ID of the header UE (i.e., source ID), one or more REs and/or an RE group may be configured as the null resource in the entire resource pool.

Alternatively, according to an embodiment of the present disclosure, if the common resource for HARQ feedback transmission is configured, some resources of the common resource (e.g., one or more REs and/or an RE group) may be configured as the null resource. Alternatively, in case of a group existing in in-coverage, the null resource may be configured through an indication of the base station. In case that a header UE performing a coordinator role exists in the group, the null resource to be used in each group may be determined through communication between header UEs. The transmitting UE and/or the header UE in the group, which performs group-based information transmission, may transmit information related to the null resource to UE(s) in the group through higher layer signaling and/or physical layer signaling. For example, the information related to the null resource may be information on location information of the null resource and/or information on a reference offset from the common resource for HARQ feedback transmission. For example, when the transmitting UE performing group-based information transmission transmits an SA for scheduling corresponding information, the transmitting UE may transmit the information related to the null resource by including it in the SA.

Figure 13:
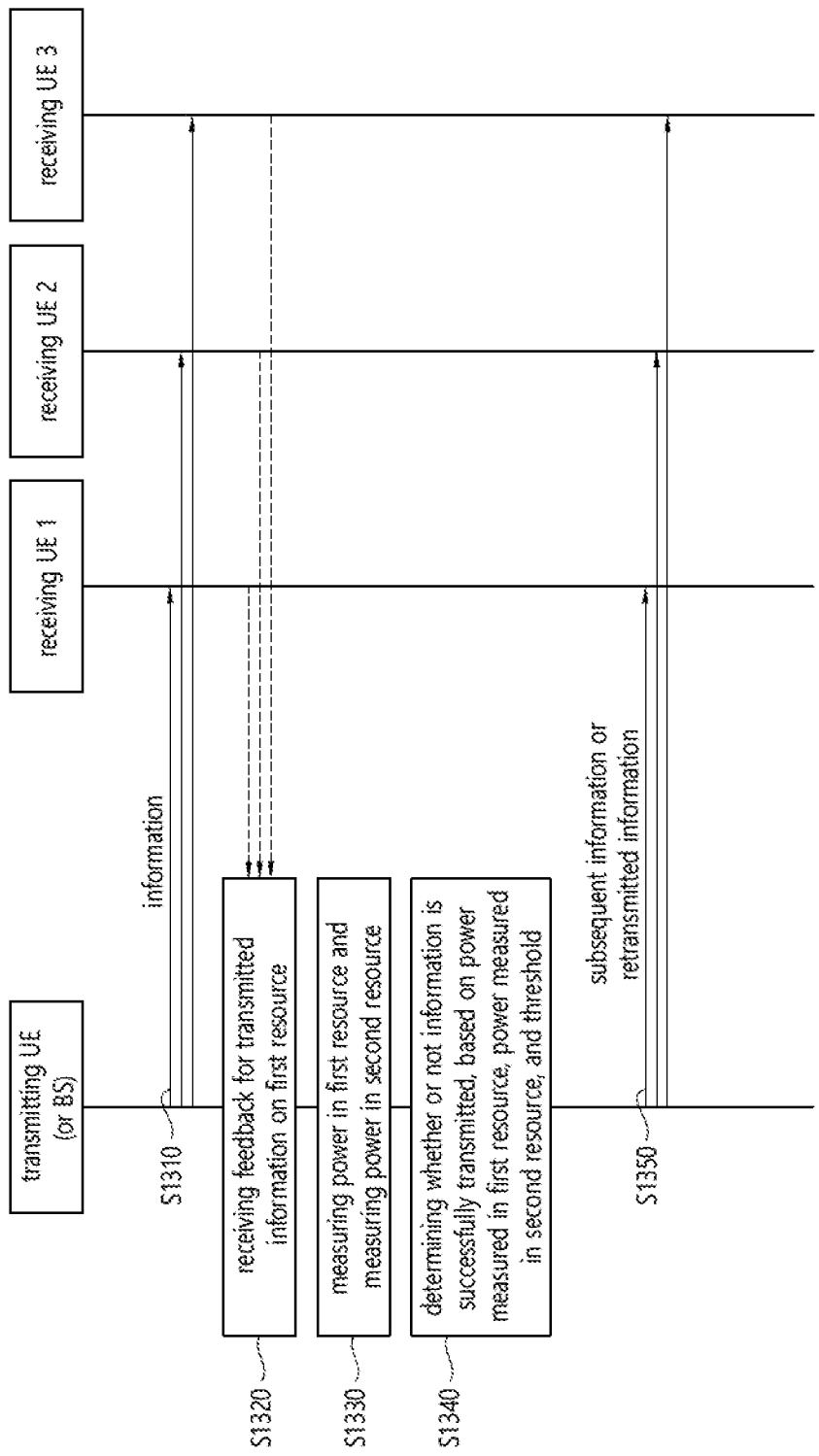
FIG. 13 shows a procedure for a transmitting UE to determine whether information has been successfully transmitted to a plurality of UEs in a group according to an embodiment of the present disclosure.

FIG. 13 shows a procedure for a transmitting UE to determine whether information has been successfully transmitted to a plurality of UEs in a group according to an embodiment of the present disclosure.

Referring to FIG. 13, in step S1310, the transmitting UE may transmit information to the plurality of UEs in the group. For example, the transmitting UE may transmit the information to the plurality of UEs belonging to the transmission group through group cast transmission.

In step S1320, in response to the transmitted information, the transmitting UE may receive zero or one or more feedback information on a first resource. For example, the first resource may be the common resource for HARQ feedback transmission. For example, the first resource may be (pre-)configured to the transmitting UE by the base station through higher layer signaling and/or physical layer signaling. For example, the first resource may be (pre-)configured to the transmitting UE by other UEs through higher layer signaling and/or physical layer signaling. For example, the first resource may be pre-defined by the transmitting UE. For example, the first resource may be pre-defined in the system.

In step S1330, the transmitting UE may measure power/energy on the first resource. In addition, the transmitting UE may measure power/energy on a second resource. For example, the second resource may be the null resource to which the plurality of UEs in the group do not perform transmission. For example, the second resource may be configured within the first resource. For example, the second resource may be configured outside the first resource. For example, the second resource may be configured based on at least one of a group ID, a location of the transmitting UE, an ID of the transmitting UE, a location of the group header UE, or an ID of the group header UE. A method of configuring the second resource has been described in detail above, and a detailed description will be omitted.

In step S1340, based on the power/energy measured in the first resource, the power/energy measured in the second resource, and a threshold, the transmitting UE may determine whether or not the information transmission is successful. For example, if the difference between the power/energy measured in the first resource and the power/energy measured in the second resource is less than or equal to (or less than) the threshold, the transmitting UE may determine that the information has been successfully transmitted to the plurality of UEs in the group. On the other hand, for example, if the difference between the power/energy measured in the first resource and the power/energy measured in the second resource is greater than (or greater than or equal to) the threshold, the transmitting UE may determine that the information has not been successfully transmitted to the plurality of UEs in the group.

For example, the threshold may be (pre-)configured to the transmitting UE by the base station through higher layer signaling and/or physical layer signaling. For example, the threshold may be (pre-)configured to the transmitting UE by other UEs through higher layer signaling and/or physical layer signaling. For example, the threshold may be pre-defined by the transmitting UE. For example, the threshold may be pre-defined in the system.

If the transmitting UE determines that the information has been successfully transmitted to the plurality of UEs in the group, additionally, in step S1350, the transmitting UE may transmit subsequent information to the plurality of UEs in the group.

Alternatively, if the transmitting UE determines that the information has not been successfully transmitted to the plurality of UEs in the group, in step S1350, the transmitting UE may retransmit the information to the plurality of UEs in the group.

According to an embodiment of the present disclosure, when the UE performs group-based transmission, the common resource for HARQ transmission and the null resource may be configured. In addition, the null resources for measuring external interference may be configured so as not to overlap as much as possible between groups for more effective interference measurement. Therefore, if the receiving UE operates to transmit the feedback on the common resource only when it fails to decode the information transmitted by the transmitting UE, the transmitting UE can more accurately reflect the external interference, and the transmitting UE can more accurately determine whether the information has been transmitted successfully. According to an embodiment of the present disclosure, the discrimination performance for HARQ feedback by the transmitting UE may be improved.

Figure 14:
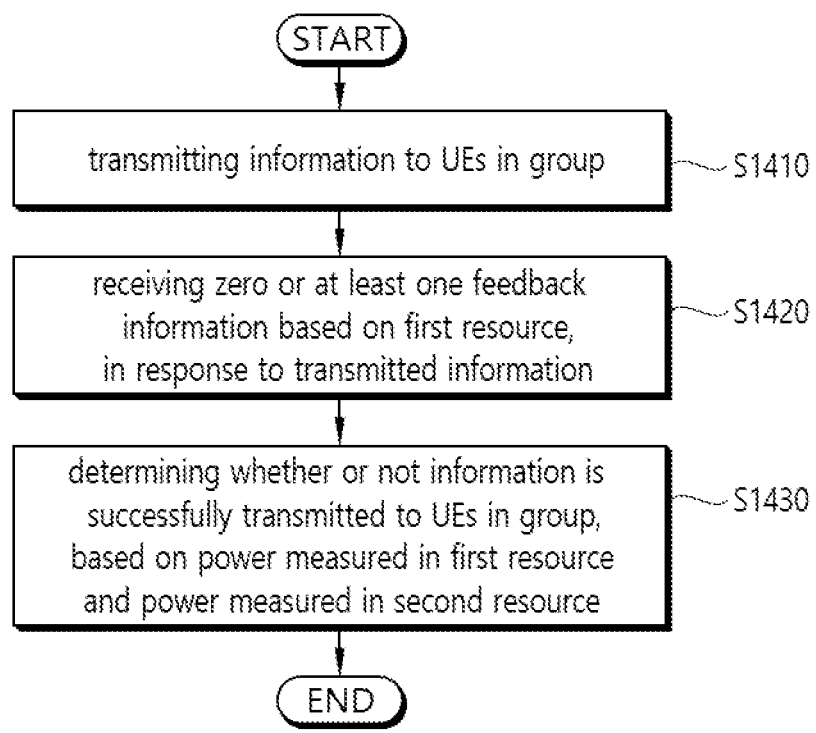
FIG. 14 shows a method for a transmitting UE to determine whether or not information is successfully transmitted to a plurality of UEs in a group according to an embodiment of the present disclosure.

FIG. 14 shows a method for a transmitting UE to determine whether or not information is successfully transmitted to a plurality of UEs in a group according to an embodiment of the present disclosure.

Referring to FIG. 14, in step S1410, the UE may transmit the information to the plurality of UEs in the group.

In step S1420, the UE may receive zero or at least one feedback information based on a first resource, in response to the transmitted information. If at least one UE among the plurality of UEs in the group fails to receive the information, the feedback information may be transmitted by at least one UE based on the first resource. The first resource may be a resource configured to the plurality of UEs in the group, for the feedback information. The feedback information may be transmitted only on the first resource by the plurality of UEs in the group.

In step S1430, the UE may determine whether or not the information is successfully transmitted to the plurality of UEs in the group, based on power measured in the first resource and power measured in a second resource.

If a difference between the power measured in the first resource and the power measured in the second resource is less than or equal to a threshold, it may be determined that the information is successfully transmitted to the plurality of UEs in the group. Additionally, if the difference between the power measured in the first resource and the power measured in the second resource is less than or equal to a threshold, the UE may transmit subsequent information to the plurality of UEs in the group.

If a difference between the power measured in the first resource and the power measured in the second resource exceeds a threshold, it may be determined that the information is not successfully transmitted to the plurality of UEs in the group. Additionally, if the difference between the power measured in the first resource and the power measured in the second resource exceeds the threshold, the UE may retransmit the information to the plurality of UEs in the group. For example, the threshold may be received from a base station or another UE. For example, the threshold may be configured by the UE.

The second resource may be a resource configured for measuring interference from outside the group. Transmission by the plurality of UEs in the group may be not performed on the second resource. For example, if the first resource is configured, the second resource may be configured at a location separated by a specific offset from the first resource. For example, if the first resource is configured, the second resource may be configured within the first resource based on an ID of the group. For example, if a resource pool for the second resource is configured, the second resource may be configured within the resource pool based on an ID of the group.

Determining whether or not the information is successfully transmitted to the plurality of UEs in the group may comprise: adjusting a threshold based on the power measured in the second resource; and determining whether or not the information is successfully transmitted to the plurality of UEs in the group, based on the adjusted threshold and the power measured in the first resource.

The proposed method may be applied to the apparatus described below. For example, the wireless device (100) of FIG. 16 may be the transmitting UE, and the wireless device (200) of FIG. 16 may be the receiving UE. The transmitting UE may include at least one processor such as the processor (102), at least one memory such as the memory (104), and at least one transceiver such as the transceiver (106). Further, the receiving UE may include at least one processor such as the processor (202), at least one memory such as the memory (204), and at least one transceiver such as the transceiver (206).

First, the processor (102) of the transmitting UE may control the transceiver (106) to transmit the information to the plurality of UEs in the group. In addition, the processor (102) of the transmitting UE may control the transceiver (106) to receive zero or at least one feedback information based on a first resource, in response to the transmitted information. In addition, the processor (102) of the transmitting UE may determine whether or not the information is successfully transmitted to the plurality of UEs in the group, based on power measured in the first resource and power measured in a second resource.

Hereinafter, an apparatus to which the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
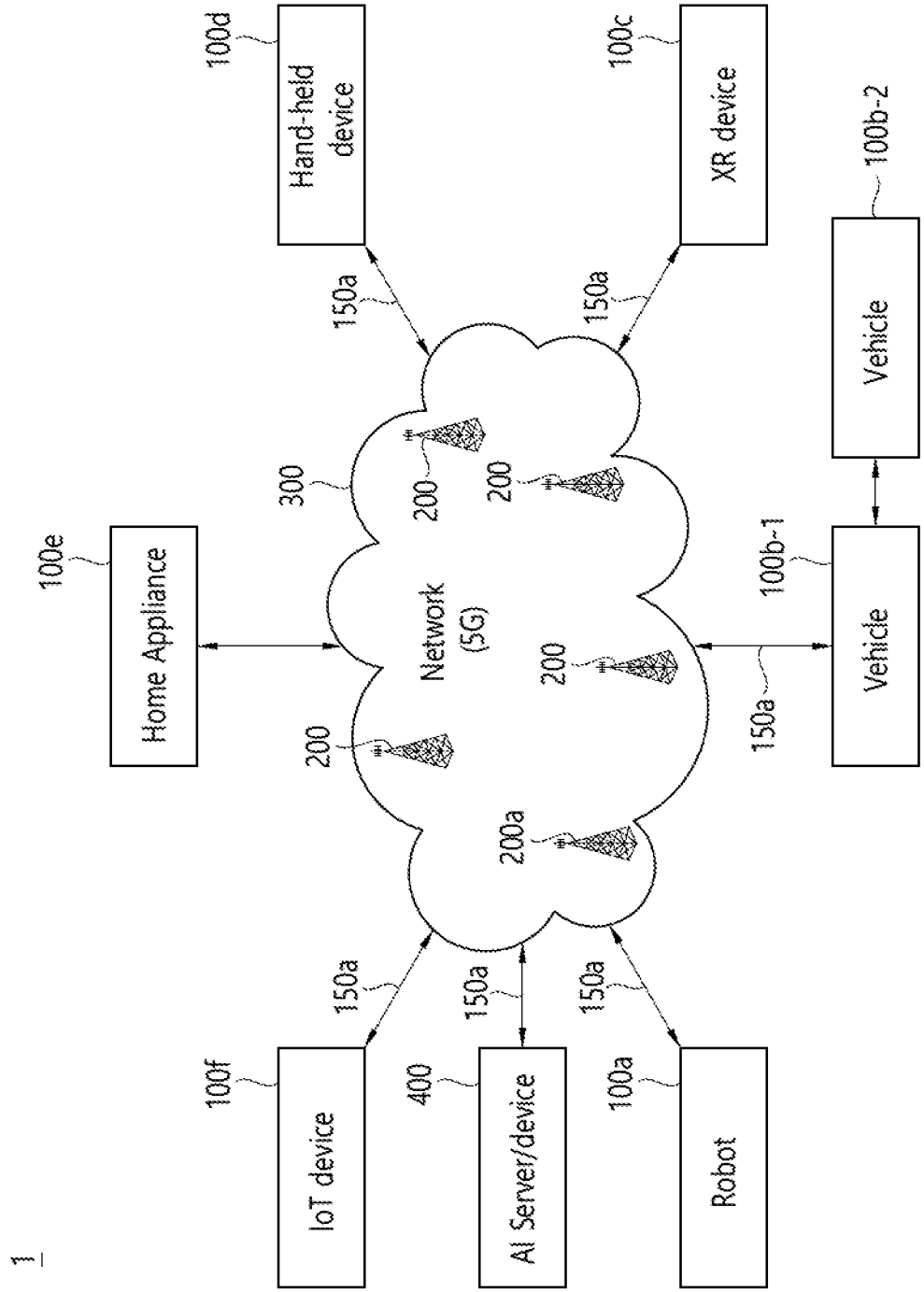
FIG. 15 shows a communication system (1) applied to the present disclosure.

FIG. 15 shows a communication system (1) applied to the present disclosure.

Referring to FIG. 15, a communication system (1) applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An AI technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b) may be established between the wireless devices (100a-100f/BS (200), or BS (200)/wireless devices (100a~100f). Herein, the wireless communication/connections (150a, 150b) may be established through various RATs (e.g., 5G NR) such as uplink/downlink communication (150a), sidelink communication (150b) (or, D2D communication), or inter BS communication (e.g., relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
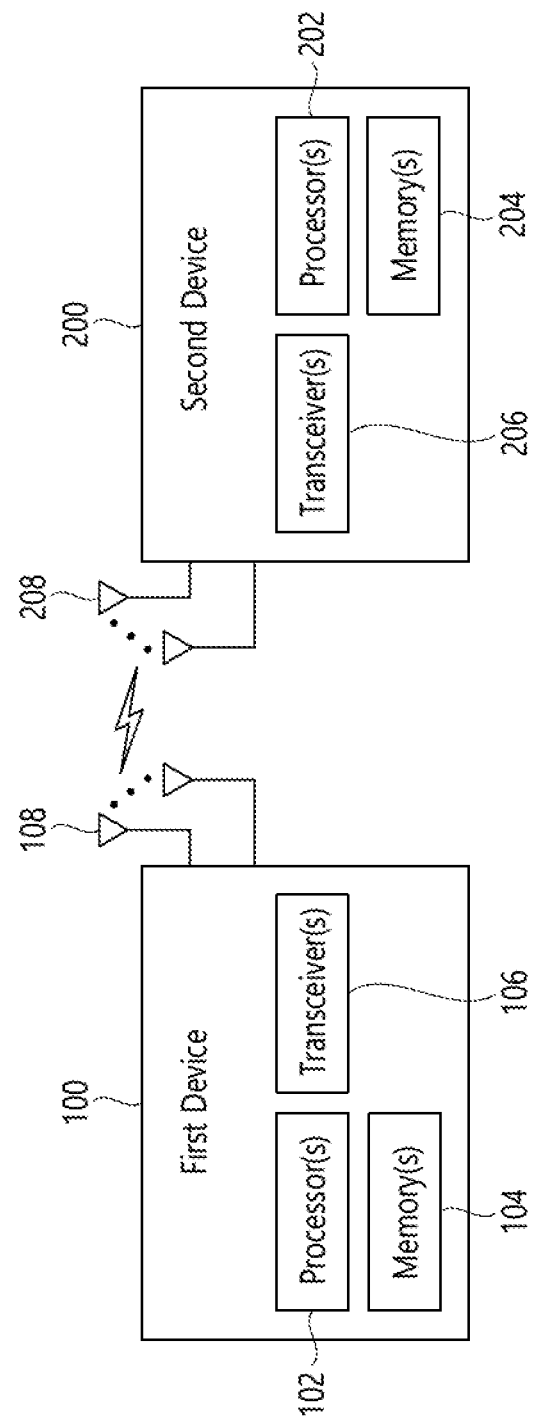
FIG. 16 shows wireless devices applicable to the present disclosure.

FIG. 16 shows wireless devices applicable to the present disclosure.

Referring to FIG. 16, a first wireless device (100) and a second wireless device (200) may transmit radio signals through a variety of RATs (e.g., LTE and NR). Herein, {the first wireless device (100) and the second wireless device (200)} may correspond to {the wireless device (100x) and the BS (200)} and/or {the wireless device (100x) and the wireless device (100x)} of FIG. 15.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store a variety of information related to operations of the processor(s) (102). For example, the memory(s) (104) may store software code including commands for performing a part or the entirety of processes controlled by the processor (s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (206) and then store information obtained by processing the fourth information/signals in the memory(s) (204). The memory(s) (204) may be connected to the processor(s) (202) and may store a variety of information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Units (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. To this end, the one or more transceivers (106, 206) may include (analog) oscillators and/or filters.

Figure 17:
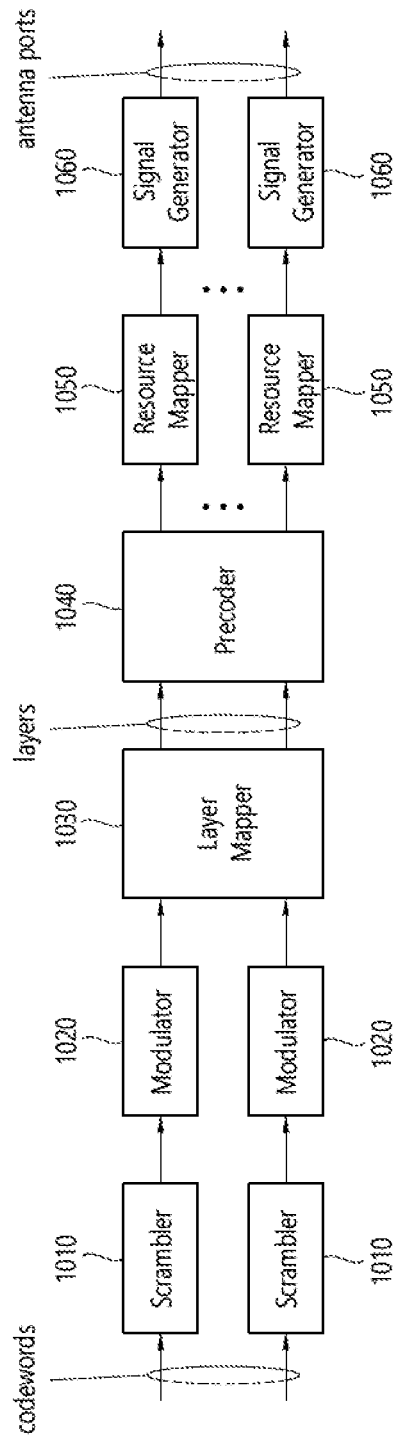
FIG. 17 shows a signal process circuit for a transmission signal.

FIG. 17 shows a signal process circuit for a transmission signal.

Referring to FIG. 17, a signal processing circuit (1000) may include scramblers (1010), modulators (1020), a layer mapper (1030), a precoder (1040), resource mappers (1050), and signal generators (1060). An operation/function of FIG. 17 may be performed, without being limited to, the processors (102, 202) and/or the transceivers (106, 206) of FIG. 16. Hardware elements of FIG. 17 may be implemented by the processors (102, 202) and/or the transceivers (106, 206) of FIG. 16. For example, blocks 1010~1060 may be implemented by the processors (102, 202) of FIG. 16. Alternatively, the blocks 1010 to 1050 may be implemented by the processors (102, 202) of FIG. 16 and the block 1060 may be implemented by the transceivers (106, 206) of FIG. 16.

Codewords may be converted into radio signals via the signal processing circuit (1000) of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 17. For example, the wireless devices (e.g., 100, 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 18:
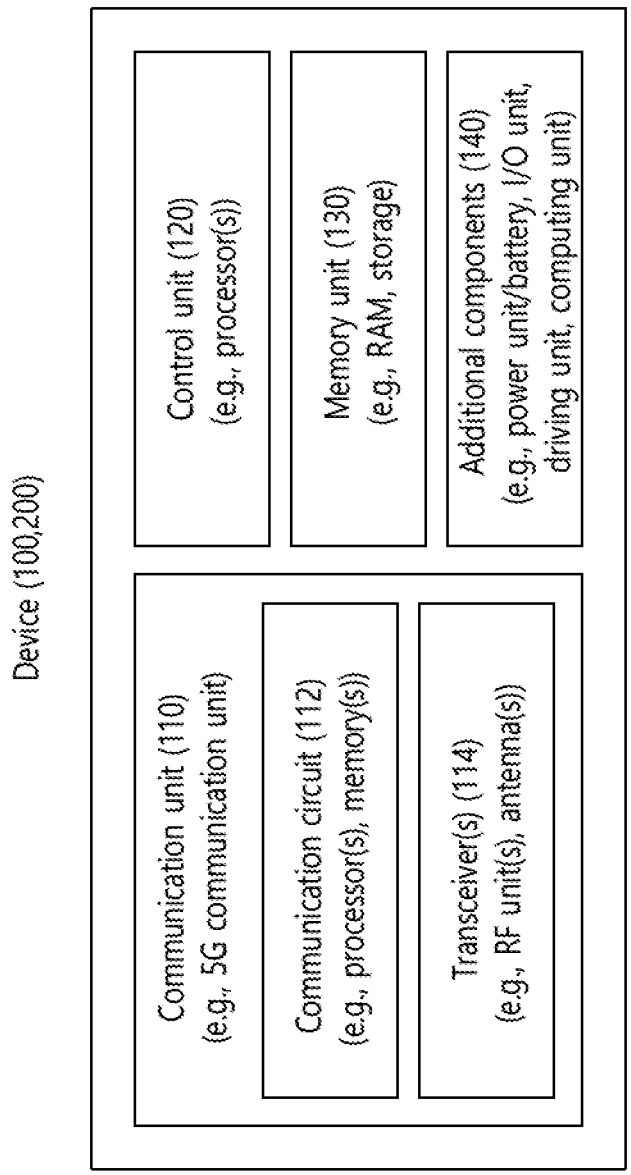
FIG. 18 shows another example of a wireless device applied to the present disclosure.

FIG. 18 shows another example of a wireless device applied to the present disclosure. The wireless device may be implemented in various forms according to a use-case/service (refer to FIG. 15 and FIGS. 19 to 24).

Referring to FIG. 18, wireless devices (100, 200) may correspond to the wireless devices (100, 200) of FIG. 16 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 16. For example, the transceiver(s) (114) may include the one or more transceivers (106, 206) and/or the one or more antennas (108, 208) of FIG. 16. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 15), the vehicles (100b-1, 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, and so on. The wireless device may be used in a mobile or fixed place according to a use-example/service.

In FIG. 18, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

Figure 19:
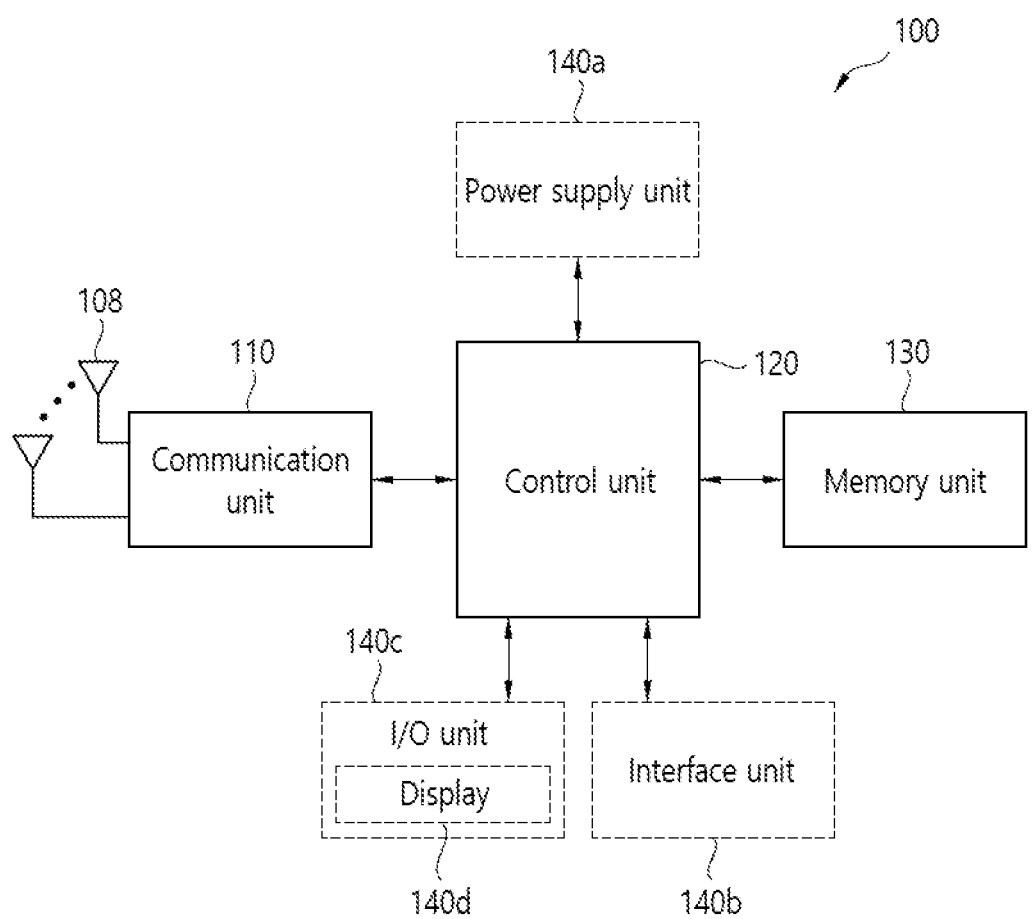
FIG. 19 shows a hand-held device applied to the present disclosure.

FIG. 19 shows a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 19, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110~130/140a~140c correspond to the blocks 110~130/140 of FIG. 18, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 20:
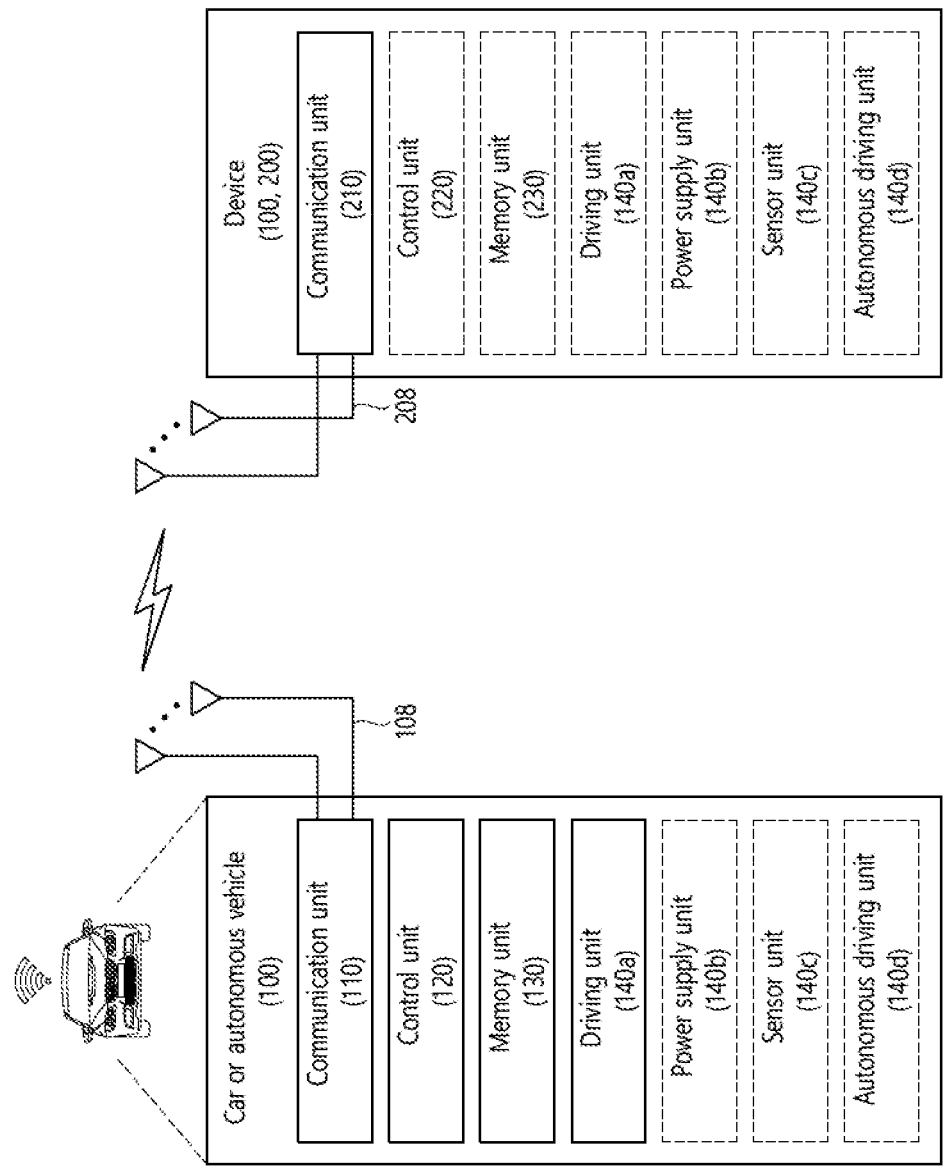
FIG. 20 shows a vehicle or an autonomous driving vehicle applied to the present disclosure.

FIG. 20 shows a vehicle or an autonomous driving vehicle applied to the present disclosure. The vehicle or autonomous driving vehicle may be implemented by a mobile robot, a car, a train, a manned/unmanned Aerial Vehicle (AV), a ship, and so on.

Referring to FIG. 20, a vehicle or autonomous driving vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a~140d correspond to the blocks 110/130/140 of FIG. 18, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous driving vehicle (100). The control unit (120) may include an Electronic Control Unit (ECU). The driving unit (140a) may cause the vehicle or the autonomous driving vehicle (100) to drive on a road. The driving unit (140a) may include an engine, a motor, a powertrain, a wheel, a brake, a steering device, and so on. The power supply unit (140b) may supply power to the vehicle or the autonomous driving vehicle (100) and include a wired/wireless charging circuit, a battery, and so on. The sensor unit (140c) may obtain a vehicle state, ambient environment information, user information, and so on. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, and so on, from an external server. The autonomous driving unit (140d) may generate an autonomous driving path and a driving plan from the obtained data. The control unit (120) may control the driving unit (140a) such that the vehicle or the autonomous driving vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous driving vehicles and provide the predicted traffic information data to the vehicles or the autonomous driving vehicles.

Figure 21:
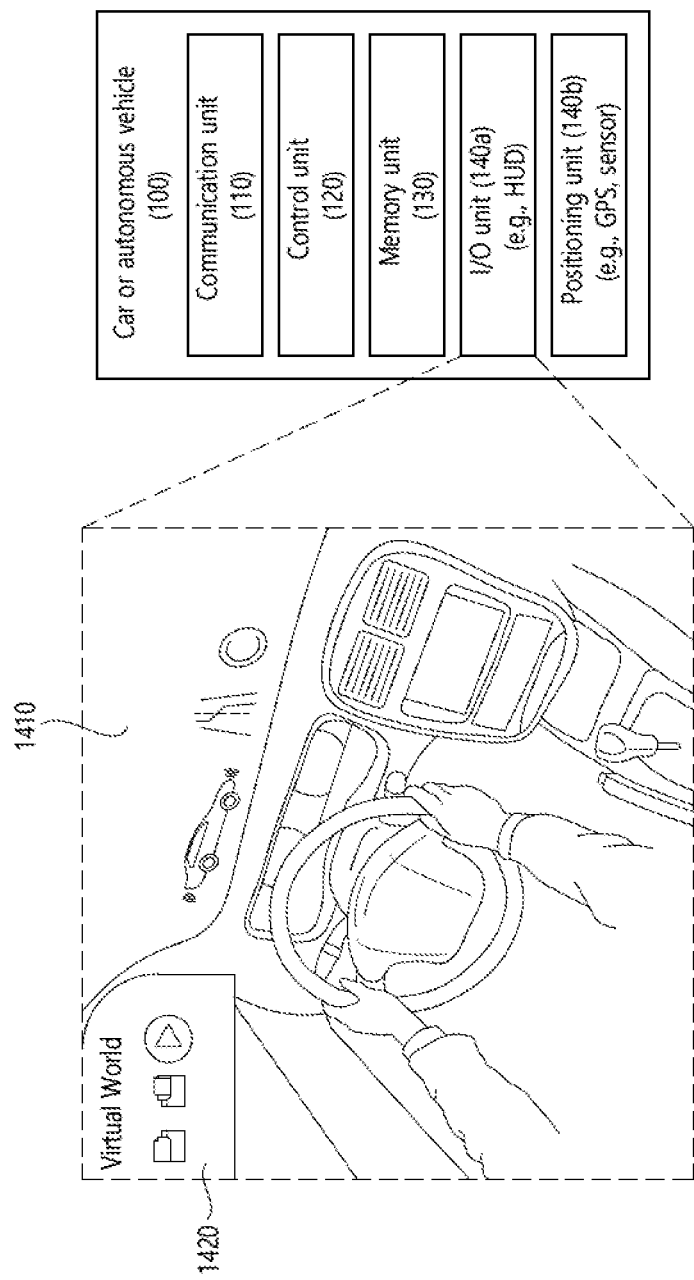
FIG. 21 shows a vehicle applied to the present disclosure.

FIG. 21 shows a vehicle applied to the present disclosure. The vehicle may be implemented as a transport means, an aerial vehicle, a ship, and so on.

Referring to FIG. 21, a vehicle (100) may include a communication unit (110), a control unit (120), a memory unit (130), an I/O unit (140a), and a positioning unit (140b). Herein, the blocks 110 to 130/140a~140b correspond to blocks 110 to 130/140 of FIG. 18.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140a) may output an AR/VR object based on information within the memory unit (130). The I/O unit (140a) may include a HUD. The positioning unit (140b) may obtain information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140b) may include a GPS and various sensors.

As an example, the communication unit (110) of the vehicle (100) may receive map information and traffic information from an external server and store the received information in the memory unit (130). The positioning unit (140b) may obtain the vehicle position information through the GPS and various sensors and store the obtained information in the memory unit (130). The control unit (120) may generate a virtual object based on the map information, traffic information, and vehicle position information and the I/O unit (140a) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140*a*). In addition, the control unit (120) may broadcast a warning message regarding driving abnormity to neighboring vehicles through the communication unit (110). According to situation, the control unit (120) may transmit the vehicle position information and the information on driving/vehicle abnormality to related organizations.

Figure 22:
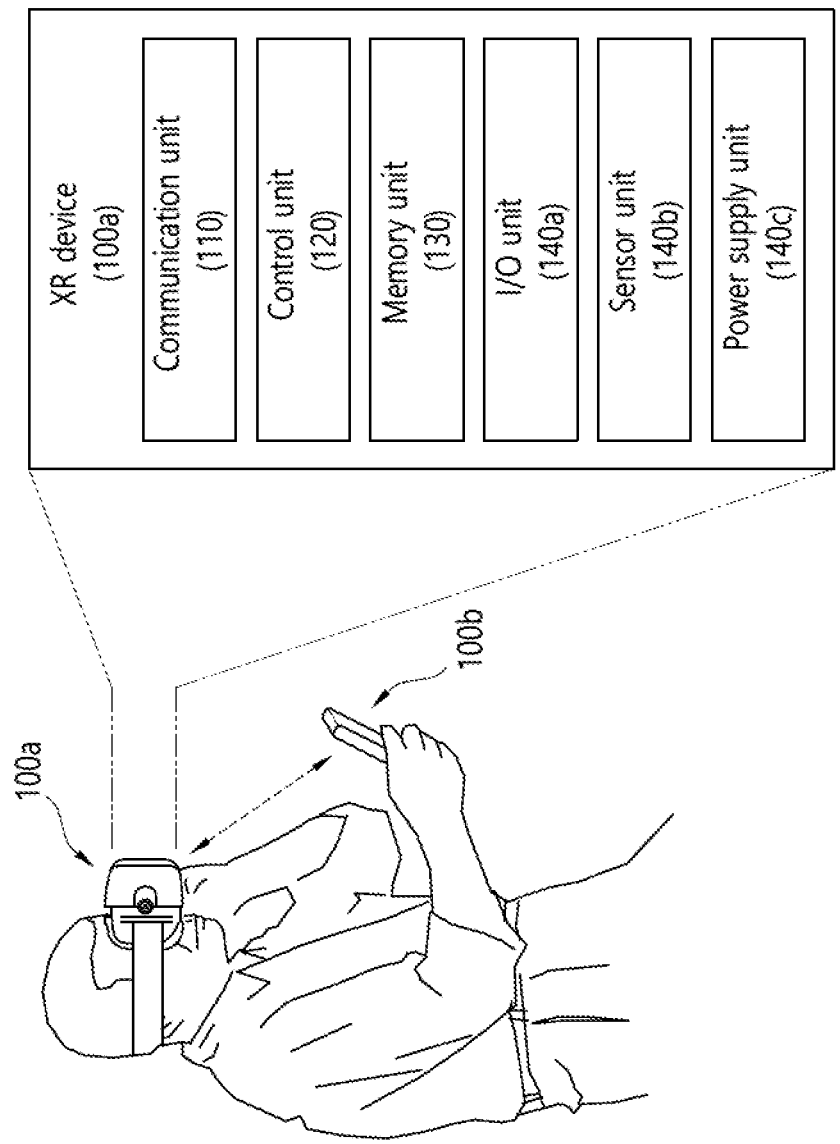
FIG. 22 shows an XR device applied to the present disclosure.

FIG. 22 shows an XR device applied to the present disclosure. The XR device may be implemented by an HMD, a HUD mounted in a vehicle, a television, a smartphone, a computer, a wearable device, a home appliance, a digital signage, a vehicle, a robot, and so on.

Referring to FIG. 22, an XR device (100*a*) may include a communication unit (110), a control unit (120), a memory unit (130), an I/O unit (140*a*), a sensor unit (140*b*), and a power supply unit (140*c*). Herein, the blocks 110 to 130/140*a*~140*c* correspond to the blocks 110 to 130/140 of FIG. 18, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100*a*). For example, the control unit (120) may be configured to control and/or perform procedures such as video/image acquisition, (video/image) encoding, and metadata generation and processing. The memory unit (130) may store data/parameters/programs/code/commands needed to drive the XR device (100*a*)/generate XR object. The I/O unit (140*a*) may obtain control information and data from the exterior and output the generated XR object. The I/O unit (140*a*) may include a camera, a microphone, a user input unit, a display unit, a speaker, and/or a haptic module. The sensor unit (140*b*) may obtain an XR device state, surrounding environment information, user information, and so on. The sensor unit (140*b*) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140*c*) may supply power to the XR device (100*a*) and include a wired/wireless charging circuit, a battery, and so on.

For example, the memory unit (130) of the XR device (100*a*) may include information (e.g., data) needed to generate the XR object (e.g., an AR/VR/MR object). The I/O unit (140*a*) may receive a command for manipulating the XR device (100*a*) from a user and the control unit (120) may drive the XR device (100*a*) according to a driving command of a user. For example, when a user desires to watch a film or news through the XR device (100*a*), the control unit (120) transmits content request information to another device (e.g., a hand-held device (100*b*)) or a media server through the communication unit (130). The communication unit (130) may download/stream content such as films or news from another device (e.g., the hand-held device (100*b*)) or the media server to the memory unit (130). The control unit (120) may control and/or perform procedures such as video/image acquisition, (video/image) encoding, and metadata generation/processing with respect to the content and generate/output the XR object based on information on a surrounding space or a real object obtained through the I/O unit (140*a*)/sensor unit (140*b*).

The XR device (100*a*) may be wirelessly connected to the hand-held device (100*b*) through the communication unit (110) and the operation of the XR device (100*a*) may be controlled by the hand-held device (100*b*). For example, the hand-held device (100*b*) may operate as a controller of the XR device (100*a*). To this end, the XR device (100*a*) may obtain information on a 3D position of the hand-held device (100*b*) and generate and output an XR object corresponding to the hand-held device (100*b*).

Figure 23:
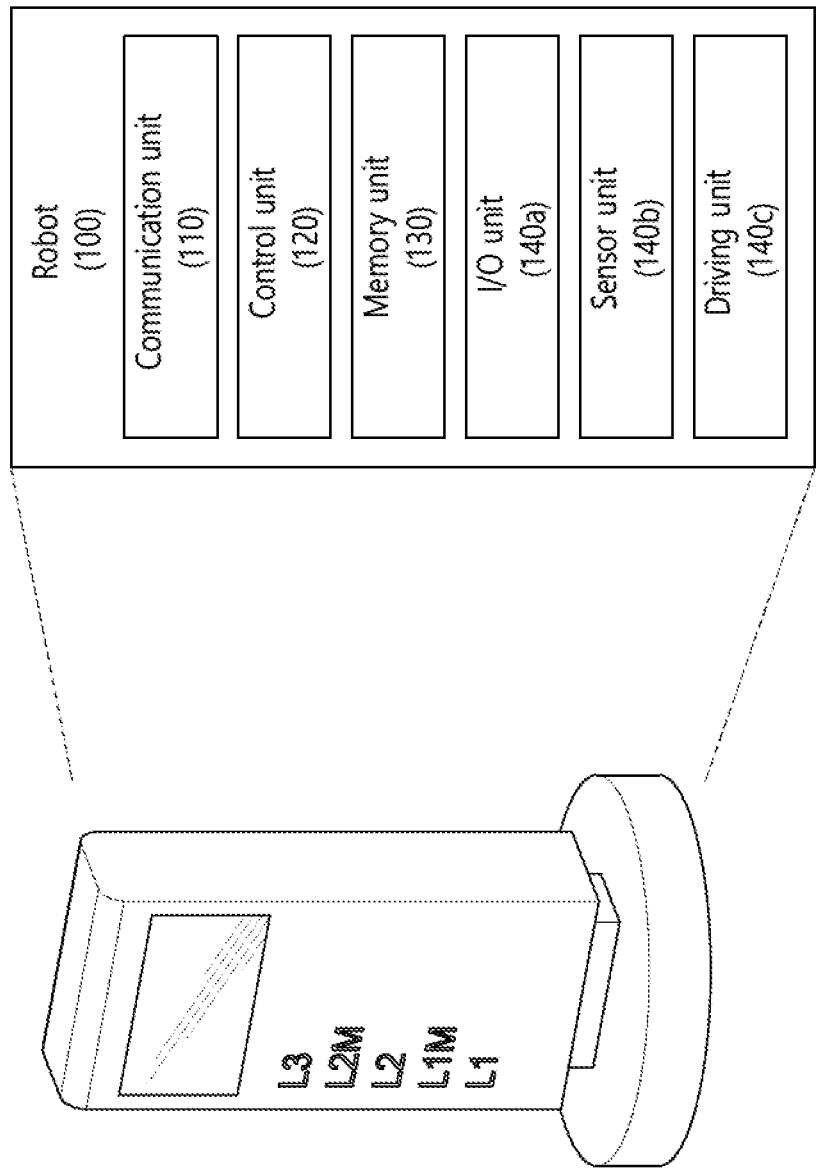
FIG. 23 shows a robot applied to the present disclosure.

FIG. 23 shows a robot applied to the present disclosure. The robot may be categorized into an industrial robot, a medical robot, a household robot, a military robot, and so on, according to a used purpose or field.

Referring to FIG. 23, a robot (100) may include a communication unit (110), a control unit (120), a memory unit (130), an I/O unit (140*a*), a sensor unit (140*b*), and a driving unit (140*c*). Herein, the blocks 110 to 130/140*a*~140*c* correspond to the blocks 110 to 130/140 of FIG. 18, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140*a*) may obtain information from the exterior of the robot (100) and output information to the exterior of the robot (100). The I/O unit (140*a*) may include a camera, a microphone, a user input unit, a display unit, a speaker, and/or a haptic module. The sensor unit (140*b*) may obtain internal information of the robot (100), surrounding environment information, user information, and so on. The sensor unit (140*b*) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, and so on. The driving unit (140*c*) may perform various physical operations such as movement of robot joints. In addition, the driving unit (140*c*) may cause the robot (100) to travel on the road or to fly. The driving unit (140*c*) may include an actuator, a motor, a wheel, a brake, a propeller, and so on.

Figure 24:
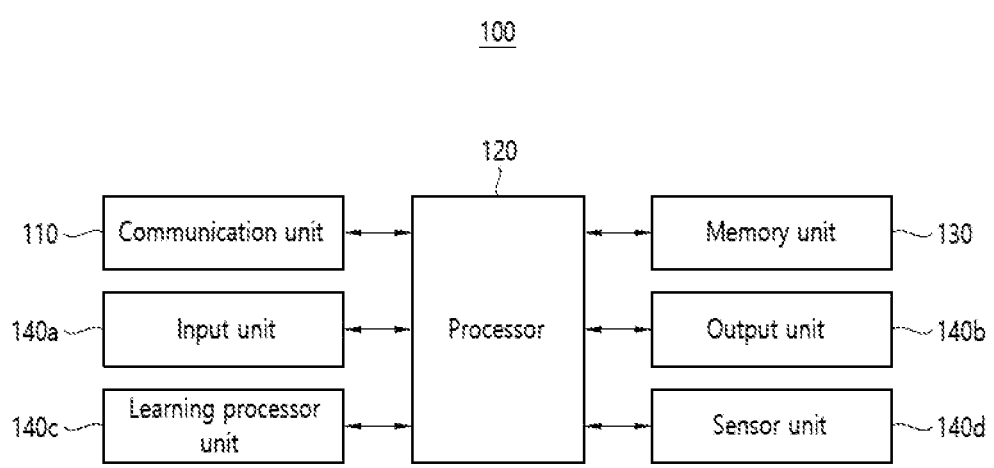
FIG. 24 shows an AI device applied to the present disclosure.

FIG. 24 shows an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, and so on.

Referring to FIG. 24, an AI device (100) may include a communication unit (110), a control unit (120), a memory unit (130), an I/O unit (140*a*/140*b*), a learning processor unit (140*c*), and a sensor unit (140*d*). The blocks 110 to 130/140*a*~140*d* correspond to blocks 110 to 130/140 of FIG. 18, respectively.

The communication unit (110) may transmit and receive wired/radio signals (e.g., sensor information, user input, learning models, or control signals) to and from external devices such as other AI devices (e.g., 100*x*, 200, 400 of FIG. 15) or an AI server (200) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 15). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may obtain various types of data from the exterior of the AI device (100). For example, the input unit (140a) may obtain learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data. The learning processor unit (140c) may perform AI processing together with the learning processor unit of the AI server (400 of FIG. 15). The learning processor unit (140c) may process information received from an external device through the communication unit (110) and/or information stored in the memory unit (130). In addition, an output value of the learning processor unit (140c) may be transmitted to the external device through the communication unit (110) and may be stored in the memory unit (130).

What is claimed is:

1. A method for determining, by a user equipment (UE), whether or not information is successfully transmitted to a plurality of UEs in a group in a wireless communication system, the method comprising:
    transmitting the information to the plurality of UEs in the group;
    receiving zero or at least one feedback information based on a first resource, in response to the transmitted information; and
    determining whether or not the information is successfully transmitted to the plurality of UEs in the group, based on power measured in the first resource and power measured in a second resource.

2. The method of claim 1, wherein, if at least one UE among the plurality of UEs in the group fails to receive the information, the feedback information is transmitted by at least one UE based on the first resource.

3. The method of claim 1, wherein, if a difference between the power measured in the first resource and the power measured in the second resource is less than or equal to a threshold, it is determined that the information is successfully transmitted to the plurality of UEs in the group.

4. The method of claim 1, wherein, if a difference between the power measured in the first resource and the power measured in the second resource exceeds a threshold, it is determined that the information is not successfully transmitted to the plurality of UEs in the group.

5. The method of claim 4, further comprising:
    retransmitting the information to the plurality of UEs in the group if the difference between the power measured in the first resource and the power measured in the second resource exceeds the threshold.

6. The method of claim 4, wherein the threshold is received from a base station or another UE, or configured by the UE.

7. The method of claim 1, wherein the first resource is a resource configured to the plurality of UEs in the group, for the feedback information.

8. The method of claim 7, wherein the feedback information is transmitted only on the first resource by the plurality of UEs in the group.

9. The method of claim 1, wherein the second resource is a resource configured for measuring interference from outside the group.

10. The method of claim 9, wherein transmission by the plurality of UEs in the group is not performed on the second resource.

11. The method of claim 1, wherein, if the first resource is configured, the second resource is configured at a location separated by a specific offset from the first resource.

12. The method of claim 1, wherein, if the first resource is configured, the second resource is configured within the first resource based on an ID of the group.

13. The method of claim 1, wherein, if a resource pool for the second resource is configured, the second resource is configured within the resource pool based on an ID of the group.

14. The method of claim 1, wherein determining whether or not the information is successfully transmitted to the plurality of UEs in the group comprises:
    adjusting a threshold based on the power measured in the second resource; and
    determining whether or not the information is successfully transmitted to the plurality of UEs in the group, based on the adjusted threshold and the power measured in the first resource.

15. A user equipment (UE) configured to determine whether or not information is successfully transmitted to a plurality of UEs in a group in a wireless communication system, the UE comprising:

at least one memory; at least one transceiver; and at least one processor connected to the at least one memory and the at least one transceiver, wherein the at least one processor is configured to:

control the at least one transceiver to transmit the information to the plurality of UEs in the group;

control the at least one transceiver to receive zero or at least one feedback information based on a first resource, in response to the transmitted information; and determine whether or not the information is successfully transmitted to the plurality of UEs in the group, based on power measured in the first resource and power measured in a second resource.

* * * * *